(12) United States Patent
Hiramatsu et al.

(10) Patent No.: US 11,188,945 B2
(45) Date of Patent: Nov. 30, 2021

(54) INFORMATION PROCESSING APPARATUS AND INFORMATION PROCESSING METHOD

(71) Applicant: Hitachi, Ltd., Tokyo (JP)

(72) Inventors: Yoshitaka Hiramatsu, Tokyo (JP);
Kazumasa Tokuhashi, Tokyo (JP);
Toshimitsu Takahashi, Tokyo (JP);
Yukinobu Maruyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/971,791

(22) PCT Filed: Feb. 22, 2019

(86) PCT No.: PCT/JP2019/006896
§ 371 (c)(1),
(2) Date: Aug. 21, 2020

(87) PCT Pub. No.: WO2020/003606
PCT Pub. Date: Jan. 2, 2020

(65) Prior Publication Data
US 2021/0081993 A1    Mar. 18, 2021

(30) Foreign Application Priority Data

Jun. 28, 2018  (JP) .............................. JP2018-123568

(51) Int. Cl.
*G06Q 30/00* (2012.01)
*G06Q 30/02* (2012.01)
*G06F 16/29* (2019.01)

(52) U.S. Cl.
CPC ......... *G06Q 30/0261* (2013.01); *G06F 16/29* (2019.01); *G06Q 30/0269* (2013.01)

(58) Field of Classification Search
None
See application file for complete search history.

(56) References Cited

U.S. PATENT DOCUMENTS

2002/0046100 A1   4/2002   Kinjo
2005/0114231 A1   5/2005   Kinjo
(Continued)

FOREIGN PATENT DOCUMENTS

CN    107591116 A    1/2018
JP    2002-073321 A  3/2002
(Continued)

OTHER PUBLICATIONS

IP.com Search History, dated Apr. 28, 2021. (Year: 2021).*
(Continued)

*Primary Examiner* — Matthew T Sittner
(74) *Attorney, Agent, or Firm* — Mattingly & Malur, PC

(57) ABSTRACT

An information processing apparatus which is configured to access a database in which a characteristic of a person and advertisement information are associated with each other for each one in an area group within a movement range of a moving object, and configured to control a movement of the moving object, the information processing apparatus comprising: a detection unit configured to detect a specific person that exists within a predetermined distance from the moving object; an acquisition unit configured to acquire a characteristic of the specific person detected by the detection unit; an extraction unit configured to extract, from the database, specific advertisement information about a specific area in a movement route to a destination point of the moving object based on the characteristic of the specific person acquired by the acquisition unit; and an output unit configured to output the specific advertisement information extracted by the extraction unit.

13 Claims, 15 Drawing Sheets

(56) References Cited

U.S. PATENT DOCUMENTS

| | | | |
|---|---|---|---|
| 2005/0216336 A1* | 9/2005 | Roberts | G06Q 30/0269 705/14.1 |
| 2009/0173561 A1* | 7/2009 | Moriguchi | B25J 5/007 180/167 |
| 2009/0299857 A1* | 12/2009 | Brubaker | G06Q 30/0247 705/14.66 |
| 2010/0222954 A1* | 9/2010 | Ichinose | G05D 1/0289 701/26 |
| 2012/0271713 A1* | 10/2012 | Nussel | G06Q 30/0241 705/14.53 |
| 2012/0290394 A1* | 11/2012 | Shapiro | H04W 4/023 705/14.58 |
| 2013/0253980 A1* | 9/2013 | Blom | G06Q 30/0251 705/7.29 |
| 2013/0290201 A1* | 10/2013 | Rodriguez Carrillo | G06Q 30/0185 705/318 |
| 2014/0136302 A1* | 5/2014 | Song | G05B 19/0426 705/14.4 |
| 2018/0032997 A1* | 2/2018 | Gordon | G06Q 30/0269 |
| 2019/0005530 A1* | 1/2019 | Greenberger | G06Q 30/0238 |
| 2019/0019218 A1* | 1/2019 | Thompson | G09F 19/14 |
| 2019/0104380 A1* | 4/2019 | Kumar | H04W 4/023 |

FOREIGN PATENT DOCUMENTS

| | | |
|---|---|---|
| JP | 2005-172879 A | 6/2005 |
| JP | 3153380 U | 9/2009 |
| JP | 2017-123120 A | 7/2017 |
| JP | 2018-067181 A | 4/2018 |

OTHER PUBLICATIONS

STIC EIC 3600 Search Report for U.S. Appl. No. 16/971,791 dated May 3, 2021 (Year: 2021).*

IP.com Search Strategy dated Apr. 28, 2021 (Year: 2021).*

International Search Report PCT/JP2019/006896 dated May 14, 2019.

Chinese Office Action received in corresponding Chinese Application No. 201980006019.8 dated Jun. 22, 2021.

* cited by examiner

INFORMATION PROCESSING APPARATUS AND INFORMATION PROCESSING METHOD

CROSS-REFERENCE TO RELATED APPLICATIONS

The present application claims priority from Japanese Patent Application No. 2018-123568 filed on Jun. 28, 2018, contents of which are incorporated into the present application by reference.

TECHNICAL FIELD

The present invention relates to an information processing apparatus and an information processing method for processing information.

BACKGROUND ART

In the related art, there is disclosed a robot that changes guidance display in real time in accordance with a location where an advertisement is posted (see, for example, PTL 1 below). In PTL 1, the robot that autonomously moves and displays advertisement and guidance includes: a communication unit configured to access a management server in which advertisement information is registered; a position detection unit configured to detect a current position of the robot; a control unit configured to convert advertisement data into advertisement display data based on the advertisement information received from the management server and output the converted data, and generate guidance display data based on a position of a guidance location and a current position of the robot detected by the position detection unit and output the generated data; and a display unit configured to display the advertisement and guidance display according to the advertisement display data and the guidance display data. A screen of the display unit includes: a first screen for displaying the advertisement based on the advertisement information supplied from the management server; and a second screen for displaying the guidance display created by the robot.

CITATION LIST

Patent Literature

PTL 1: JP-A-2005-172879

SUMMARY OF INVENTION

Technical Problem

However, since the robot disclosed in PTL 1 displays only the advertisement of the guidance location until a user arrives at the guidance location, there is a problem that a timely advertisement cannot be output until the user arrives at the guidance location.

An object of the invention is to implement effective advertisement output.

Solution to Problem

According to an information processing apparatus and an information processing method according to one aspect of the invention disclosed in the present application, in the information processing method and the information processing apparatus which is configured to access a database in which a characteristic of a person and advertisement information are associated with each other for each one in an area group within a movement range of a moving object, and configured to control movement of the moving object, the information processing apparatus includes: a detection unit configured to detect a specific person that exists within a predetermined distance from the moving object; an acquisition unit configured to acquire a characteristic of the specific person detected by the detection unit; an extraction unit configured to extract, from the database, specific advertisement information about a specific area in a movement route to a destination point of the moving object based on the characteristic of the specific person acquired by the acquisition unit; and an output unit configured to output the specific advertisement information extracted by the extraction unit.

Advantageous Effect

According to an exemplary embodiment of the invention, it is possible to improve efficiency of advertisement output during guidance. Problems, configurations, and effects other than those described above will become apparent from the following description of embodiments.

DESCRIPTION OF EMBODIMENTS

<Example of Advertisement Output During Guidance>

Figure 1:
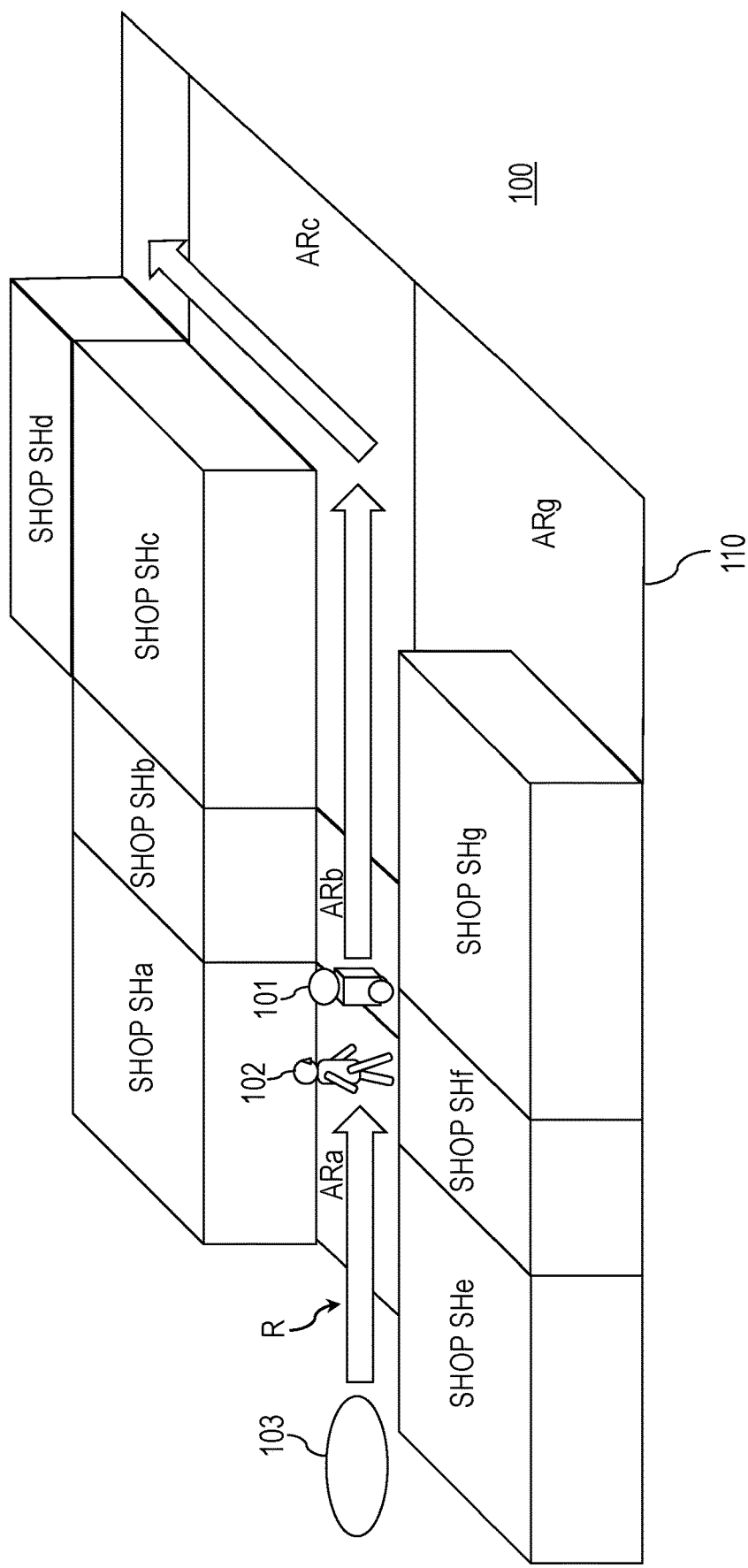
FIG. 1 is a diagram showing an advertisement example during guidance of a user.
Figure 2:
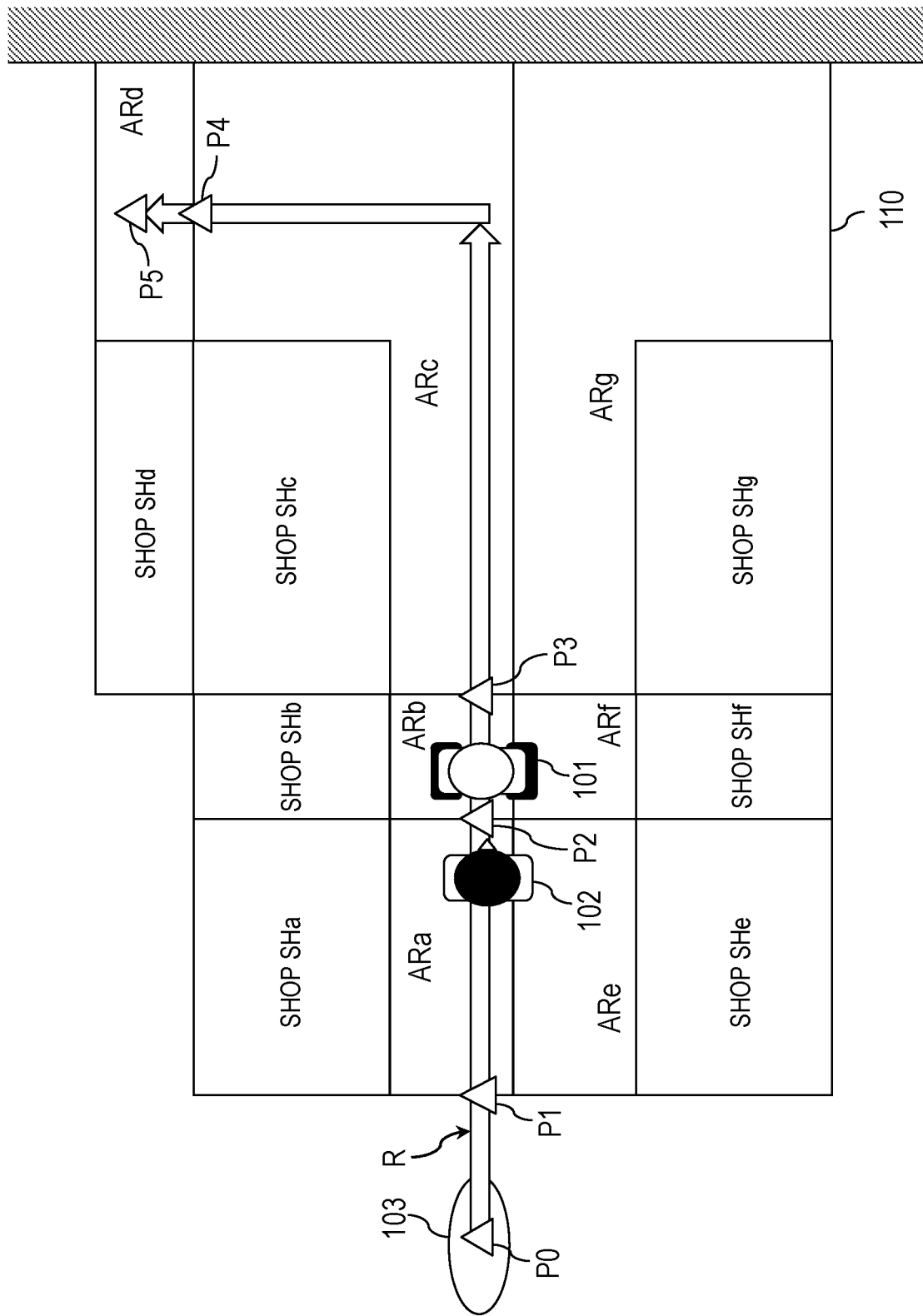
FIG. 2 is a plan view showing the advertisement example during the guidance of the user.

FIG. 1 is a diagram showing an advertisement example during guidance of a user. FIG. 2 is a plan view showing the advertisement example during the guidance of the user. A robot 101 according to the present embodiment can move within a movable range (movement range) in, for example, a shopping mall, a department store, an exhibition hall, a commercial building, an office building, an airport, and a station. In the present embodiment, a shopping mall will be described as an example. In the case of a shopping mall, the movement range is, for example, a passage 110 ahead of shops SHa to SHg (when not particularly distinguished, simply referred to as a shop SH), along which a shopper or the robot 101 can move. The passage 110 constitutes an area group (ARa to ARg, when not distinguished, simply referred to as an area AR) divided for each shop SH.

Here, it is assumed that a certain shopper (hereinafter, a user) 102 searches for the shop SHd. It is assumed that the robot 101 is stopped at a certain position 103. When the user inputs the shop SHd, which is a destination point, to the robot 101 stopped at the position 103, the robot 101 is a moving object that generates a movement route R from the certain position 103 that is a current position to the shop SHd, and guides the user to the shop SHd along the movement route R. The user follows the robot 101. Points P1 to P4 are entry start points of the areas ARa to ARd in a traveling direction of the robot 101 in the movement route R.

During the guidance, the robot 101 displays advertisement information set in an area including the current position to the user as a sound output or screen. For example, when the robot 101 passes through the point P1 in the movement route Rand enters the area ARa, the advertisement information set in the area ARa is displayed to the user as sound output or screen, and when the robot 101 passes through the point P2 in the movement route R and enters the area ARb, the advertisement information set in the area ARb is displayed to the user as sound output or screen. The similar applies to the areas ARc and ARd.

Thus, the robot 101 can provide the advertisement information to the user in a timely manner by outputting the advertisement information set in the area AR to be passed through until the user arrives at the point P5 as the destination point.

For example, if the advertisement information set in the area ARa is advertisement information of the shop SHa related to a product sold by the shop SHa or a service provided by the shop SHa, the user can see the shop SHa while acquiring the advertisement information of the shop SHa in the area ARa. Thus, the robot 101 can provide the advertisement while effectively utilizing the movement time of the user during the guidance.

For another example, if the advertisement information set in the area ARa is advertisement information of the shop SHd related to a product sold by the shop SHd or a service provided by the shop SHd, the user can move while acquiring the advertisement information of the shop SHd in the area ARa, and pre-fetch information about the product and service of the shop SHd before arrival at the shop SHd. The advertisement information set in the area AR may be other pieces of advertisement information other than the advertisement information related to the shop SH.

<System Configuration Example>

Figure 3:
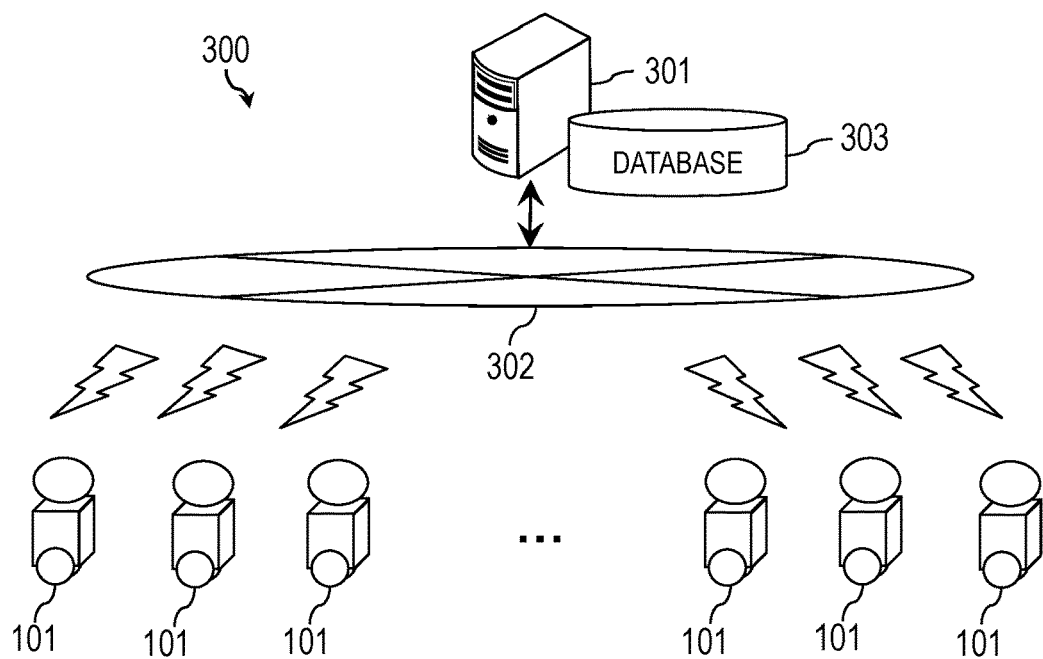
FIG. 3 is a diagram showing a system configuration example of an information processing system.

FIG. 3 is a diagram showing a system configuration example of an information processing system. An information processing system 300 includes a server 301 and one or more robots 101. The server 301 and the robot 101 are communicably connected via a network 302. The server 301 holds a database 303 that stores information to be used by the robot 101. The database 303 stores, for example, advertisement information. Details of the database 303 will be described later.

Figure 4:
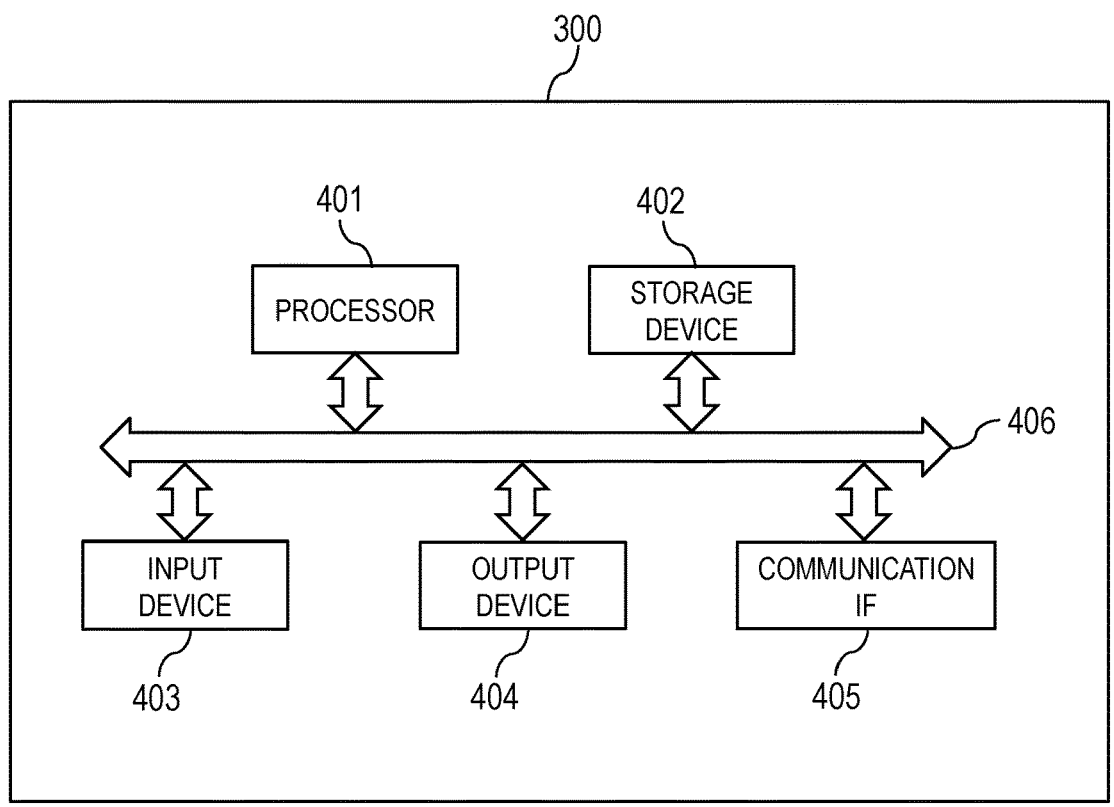
FIG. 4 is a block diagram showing a hardware configuration example of a server.

FIG. 4 is a block diagram showing a hardware configuration example of the server 301. The server 301 includes a processor 401, a storage device 402, an input device 403, an output device 404 and a communication interface (communication IF) 405. The processor 401, the storage device 402, the input device 403, the output device 404 and the communication IF 405 are connected via a bus 406. The processor 401 controls the server 301. The processor 401 executes a program. The storage device 402 is an operation area of the processor 401. The storage device 402 is a non-temporary or temporary recording medium that stores various programs and data (including map information of the passage 110 and the shop SH as shown in FIGS. 1 and 2). The storage device 402 is, for example, a read only memory (ROM), a random access memory (RAM), a hard disk drive (HDD) or a flash memory. The input device 403 inputs data. The input device 403 is, for example, a keyboard, a mouse, a touch panel, a ten key or a scanner. The output device 404 outputs data. The output device 404 is, for example, a display or a printer. The communication IF 405 is connected to a network, and transmits and receives data.

Figure 5:
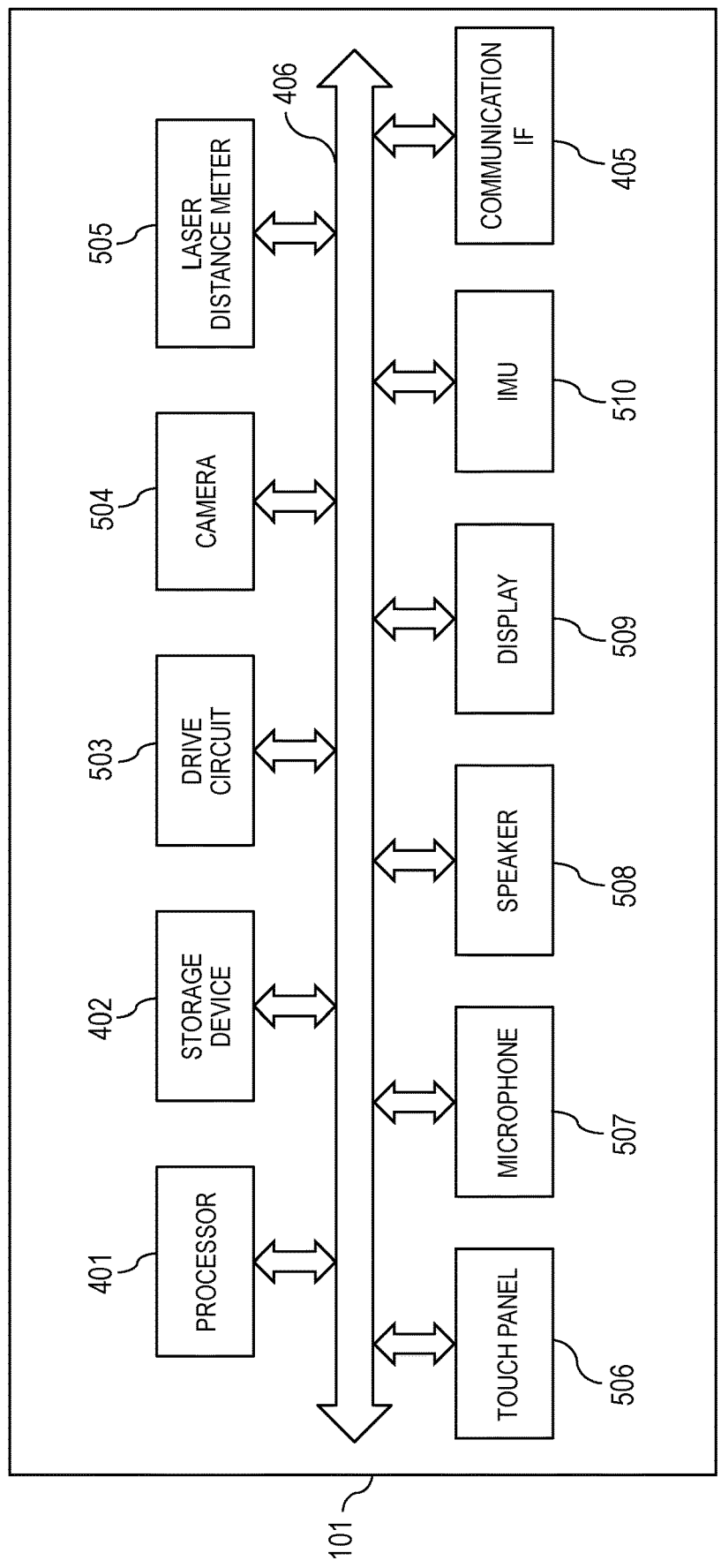
FIG. 5 is a block diagram showing a hardware configuration example of a robot.

FIG. 5 is a block diagram showing a hardware configuration example of the robot 101. The same configurations as those in FIG. 4 are denoted by the same reference numerals, and the description thereof is omitted. The robot 101 includes the processor 401, the storage device 402, a drive circuit 503, a camera 504, a laser distance meter 505, a touch panel 506, a microphone 507, a speaker 508, a display 509, an internal measurement unit (IMU) 510, and the communication IF 405. The drive circuit 503 drives a drive mechanism such as an arm, a leg, a joint, and a wheel of the robot 101 according to an instruction from the processor 401. The camera 504 captures an image of a subject from the robot 101 and outputs the image to the storage device 402 as image data. In the present embodiment, the image data from the camera 504 is used for, for example, characteristic recognition or follow-up judgement of the user and detection of an obstacle (including a person) that exists in the traveling direction of the robot 101. The camera 504 may be a camera 504 capable of measuring a distance, such as a stereo camera or an RGBD camera.

The laser distance meter 505 measures a distance and a direction with respect to a laser irradiation target (for example, a user or an obstacle). The laser distance meter 505 is, for example, a laser range finder. The touch panel 506 is provided on the display 509, and receives designation of information displayed on the display 509 by an external contact operation. The microphone 507 receives input of a sound from the outside and outputs the sound as sound data to the storage device 402. The speaker 508 outputs a sound based on the sound data stored in the storage device 402. The display 509 displays an image based on the image data stored in the storage device 402. The IMU 510 is a sensor device including a gyro sensor, an acceleration sensor, and a magnetic sensor, and detects a posture and a direction of the robot 101.

The robot 101 can execute self-position estimation and map creation using, for example, a simultaneous localization and mapping (SLAM) technique using the camera 504, a laser rangefinder, and the IMU 510. The robot 101 can generate the movement route R from the current position of the robot 101 to the destination point designated by the user by a map (see FIG. 2) created by the SLAM and the self-position estimation, and can move along the movement route R. The created map information is uploaded from the robot 101 to the server 301 and stored in the storage device 402 from the server 301.

<Advertisement Information DB>

Figure 6:
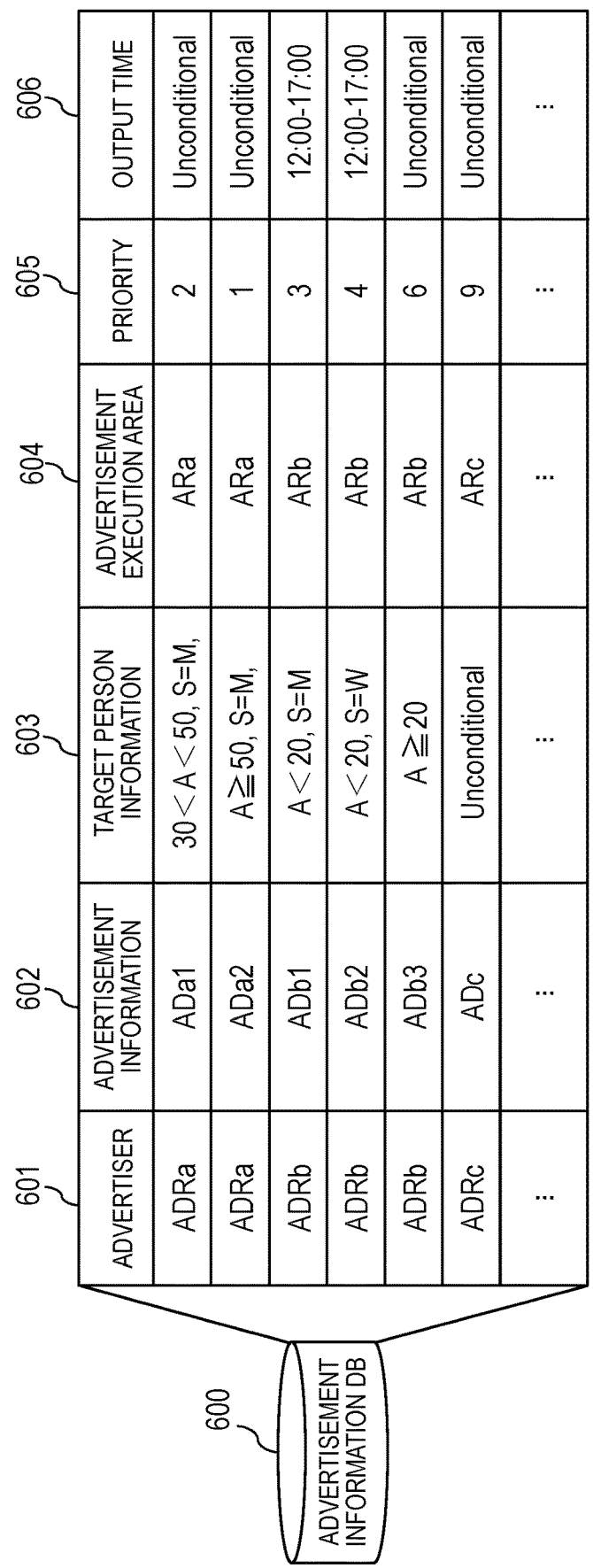
FIG. 6 is a diagram showing an example of stored contents of an advertisement information database (DB).

FIG. 6 is a diagram showing an example of stored contents of an advertisement information database (DB). An advertisement information DB 600 is a database in which a characteristic of a person and advertisement information are associated with each other for each one in an area group in a passage in which the robot 101 moves. The advertisement information DB 600 is implemented by, for example, the database (the storage device 402 of the server 301) shown in FIG. 3. The advertisement information DB 600 includes an advertiser 601, advertisement information 602, target person information 603, an advertisement execution area 604, a priority 605, and an output time 606 as fields, and forms one entry by a combination of values of fields. The advertiser 601 is identification information that uniquely specifies a supply source of the advertisement information 602 of the entry. The advertisement information 602 is information related to an advertisement to be output, and specifically, for example, sound data, image data, or video data related to an advertisement.

The target person information 603 is information indicating a characteristic of a target person to which the advertisement information 602 of the entry should be output. Specifically, for example, "A" indicates age, and "S" indicates sex (male if S=M, female if S=W). When no condition designation is designated, "Unconditional" is presented. In the present embodiment, the processor 401 estimates, by the program stored in the storage device 402 of the robot 101, characteristics such as the age and sex of the user based on image data of a face of the user, or may acquire the characteristics of the user by operation input of the user to the robot 101. In a case of a user whose characteristics are registered in advance in the server 301, the robot 101 may acquire the characteristics of the user registered in the server 301 from the server 301 by giving the robot 101 a user ID associated with the characteristics. In this case, since the characteristics of the user are registered in advance by the user, in addition to the age and sex, the characteristics of the user such as a hobby, a skill, and a product purchase history are also included.

The advertisement execution area is identification information for uniquely specifying an area where the robot 101 should execute the output of the advertisement information 602. The advertisement execution area 604 is preferable because it is possible to immediately advertise an area related to advertisement contents of the advertisement information 602 of the entry, for example, the advertisement information 602 of a shop SH facing the advertisement execution area 604.

The priority 605 is an index value for determining whether an own entry should be given priority to another entry. In the present embodiment, an entry of the priority 605 having a high value is given priority. Specifically, for example, when two entries are compared, the advertisement execution area 604 of the entry having a high priority 605 is relatively enlarged, and the advertisement execution area 604 of the entry having a low priority 605 is reduced. The value of the priority 605 is set, for example, by an amount of contract fee paid by the advertiser 601 to the operator of the server 301. The output time 606 is a time at which the advertisement information 602 of the entry can be output. When the output can be made in any time period, "Unconditional" is presented.

<Setting Information Table>

Figure 7:
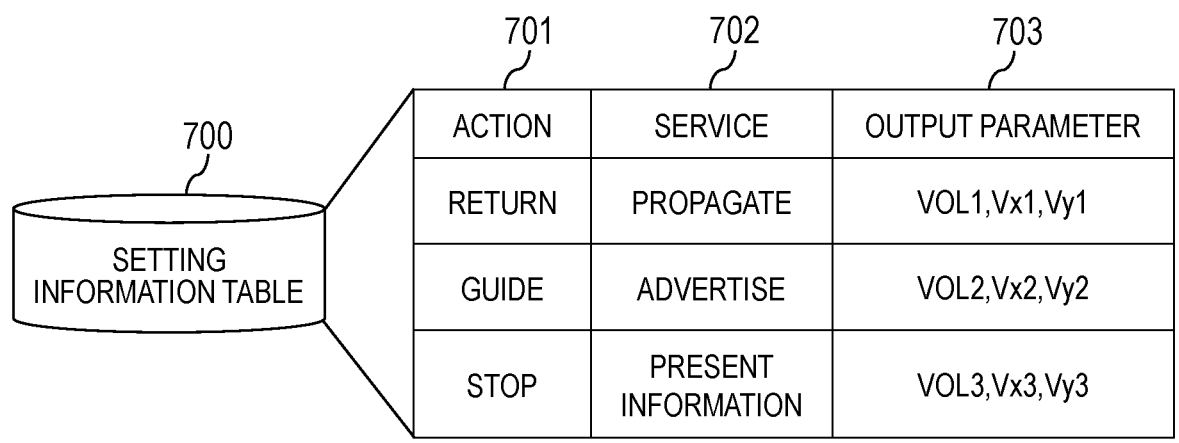
FIG. 7 is a diagram showing an example of stored contents of a setting information table.

FIG. 7 is a diagram showing an example of stored contents of a setting information table. A setting information table 700 is a table for setting output parameters according to an action of the robot 101. The setting information table 700 is implemented by, for example, the database 303 shown in FIG. 3 or the storage device 402 of the robot 101. The setting information table 700 includes an action 701, a service 702, and an output parameter 703 as fields, and forms an entry by a combination of values of the fields.

The action 701 specifies an operation that the robot 101 takes. The action 701 includes, for example, "return", "guide", and "stop". The "return" is an action 701 that the robot 101 returns to a home position. The home position is an initial position at which the robot 101 waits, and may be a position common to all the robots 101 or may be different for each robot 101. The position 103 may be the home position. The "guide" is an action 701 that takes the user to the destination point. The "stop" is an action 701 that the robot 101 remains at the point.

The service 702 includes, for example, "propagate", "advertise", and "present information". The "propagate" is a provision operation executed by the robot 101 during "return", and specifically, for example, outputs propagation information and announcement information prepared in advance in an unspecified number. The "advertise" is a provision operation that the robot 101 outputs the advertisement information 602 to the user during "guide". The "present information" is a provision operation of outputting information (sound output or screen display) from the robot 101 to the user by a dialogue with the user (including an operation input from the user to the robot 101) during "stop" of the robot 101.

The output parameter 703 is a parameter related to the output of information from the robot 101. Specifically, for example, the output parameter 703 includes a volume VOL, a moving speed Vx, and a speech speed Vy. The volume VOL is loudness of the sound output from the speaker 508 of the robot 101. The moving speed Vx is a speed at which the robot 101 moves. The speech speed Vy is a speed of a speech (sound output) from the robot 101.

<Functional Configuration Example of Information Processing Apparatus>

Figure 8:
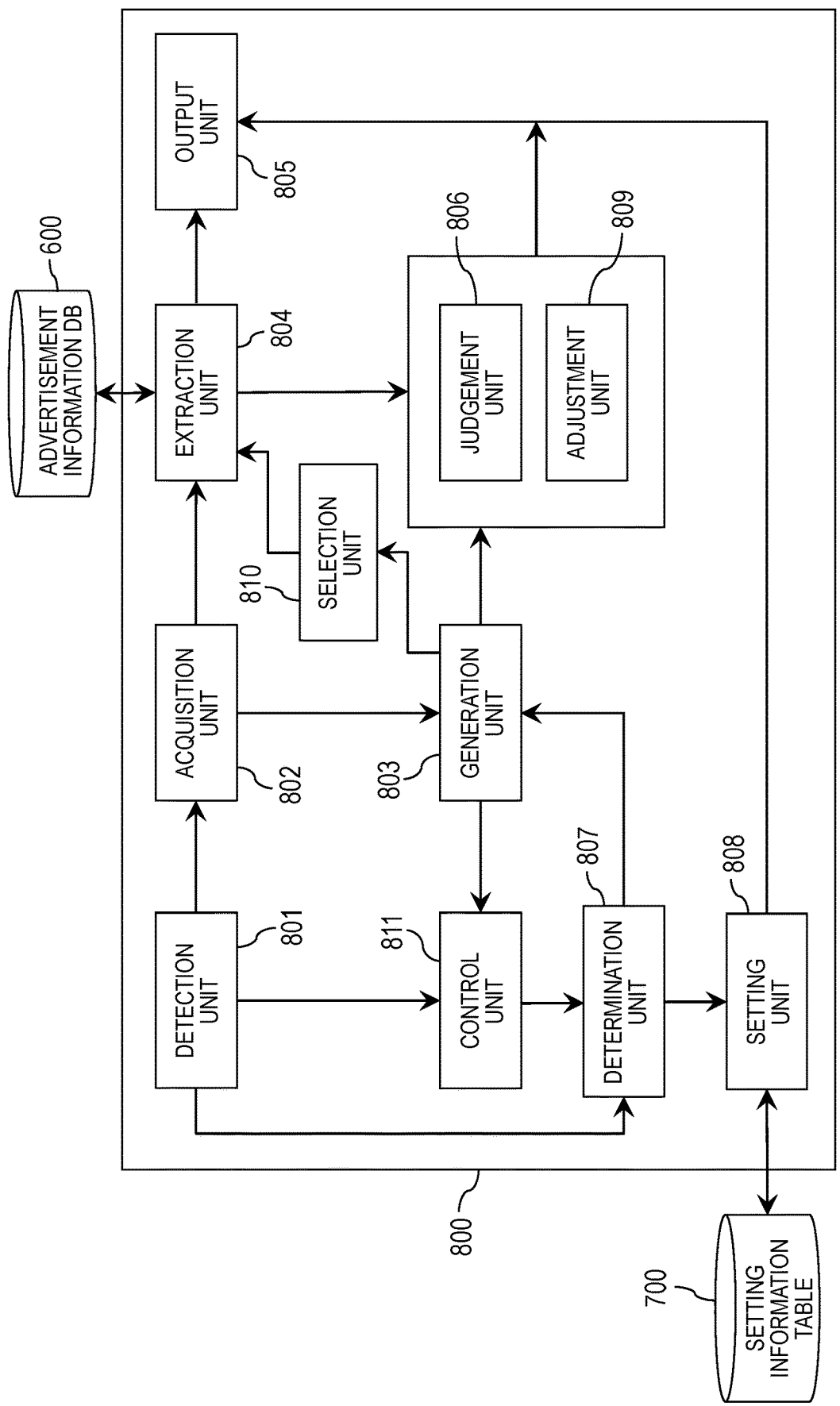
FIG. 8 is a block diagram showing a functional configuration example of an information processing apparatus.

FIG. 8 is a block diagram showing a functional configuration example of an information processing apparatus. An information processing apparatus 800 is a computer mounted on the robot 101. The information processing apparatus 800 can access the advertisement information DB 600 and controls a movement of the robot 101. In FIG. 8, the setting information table 700 is described as being stored in the database 303 of the server 301.

The information processing apparatus 800 includes a detection unit 801, an acquisition unit 802, a generation unit 803, an extraction unit 804, an output unit 805, a judgement unit 806, a determination unit 807, a setting unit 808, an adjustment unit 809, a selection unit 810, and a control unit 811. Specifically, the units are implemented by, for example, causing the processor 401 to execute a program stored in the storage device 402.

The detection unit 801 detects a specific person that exists within a predetermined distance from a moving object. Specifically, for example, the detection unit 801 detects the specific person based on image data of the specific person that exists within a predetermined distance from the robot 101 by the laser distance meter 505 and captured by the camera 504, for example, by a known face detection technique.

The acquisition unit 802 acquires a characteristic of the specific person detected by the detection unit 801. Specifically, for example, the acquisition unit 802 specifies the face of the specific person based on the image data of the specific person, and estimates the characteristics such as sex, age, and gender from the face of the specific person by a known sex and age estimation technique. In this case, the acquisition unit 802 may estimate a height of the specific person based on the distance detected by the laser distance meter 505 and a size of the detected face. The acquisition unit 802 acquires position information of a shop to be a destination point by an operation input from a user. The acquisition unit 802 acquires the current position of the robot 101 by the self-position estimation of the SLAM technique described above.

The generation unit 803 generates map information including the passage 110 as the movement range and the shop SH by map generation of the SLAM technique described above.

The extraction unit 804 extracts, from the advertisement information DB 600, the specific advertisement information 602 about the specific area in the movement route R to a destination point of the moving object based on the characteristic of the specific person acquired by the acquisition unit 802. The specific person includes not only a user who requests guidance of the robot 101 but also a follower who does not request guidance but follows the robot 101.

For example, the extraction unit 804 specifically extracts, from the advertisement information DB 600, the specific advertisement information 602 corresponding to age A and sex S, which is the characteristics of the user acquired by the acquisition unit 802, about each of the specific areas ARa, ARb, ARc, and ARd that are advertisement execution areas 604 in the movement route R shown in FIGS. 1 and 2. For example, if the age A of the user is 32 and the sex S thereof is male M, the values ADa1, ADb3, ADc, . . . of the advertisement information 602 are extracted as the specific advertisement information 602. When the characteristic of the user does not correspond to the target person information 603, the extraction unit 804 may not extract the advertisement information 602 about the advertisement execution area 604 or extract the announcement information set in advance.

The output unit 805 outputs the specific advertisement information 602 extracted by the extraction unit 804. Specifically, for example, the output unit 805 outputs a sound from the microphone 507 if the specific advertisement information 602 is sound data, displays an image on the display 509 if the specific advertisement information 602 is image data, or outputs a sound from the microphone 507 and reproduces a video on the display 509 if the specific advertisement information 602 is video data.

The output unit 805 outputs the specific advertisement information 602 about the specific area including the current position of the moving object during the movement of the moving object in movement route R. Specifically, for example, the output unit 805 outputs the specific advertisement information 602 about the specific area including the current position of the robot 101 during the guidance of the robot 101 for the user. For example, when the robot 101 is positioned in the area ARa that is the specific area, the output unit 805 outputs the value ADa1 of the advertisement information 602 that is the specific advertisement information 602 about the area ARa. Thus, the output unit 805 can output the specific advertisement information 602 at the current position to the user in a timely manner during traveling in the movement route R.

The output unit 805 outputs the specific advertisement information 602 about the specific area including the current position of the moving object during detection of the specific person by the detection unit 801. If the specific person is being detected by the detection unit 801, the specific person is following the robot 101. Therefore, when the specific person is following the robot 101, by outputting the specific advertisement information 602 corresponding to the characteristic of the specific person each time the specific person passes through the specific area, it is possible to effectively advertise.

The judgement unit 806 judges whether the moving object enters the specific area based on the current position of the moving object. Specifically, for example, as shown in FIG. 2, the judgement unit 806 judges whether the robot 101 passes through the points P1 to P4 in the movement route R. When it is judged that the robot 101 passes through the points, the judgement unit 806 separately judges whether the robot 101 enters the areas ARa to ARd.

In this case, the output unit 805 outputs the specific advertisement information 602 about the specific area as an entry destination of the moving object, based on a judgement result of the judgement unit 806. Accordingly, the specific advertisement information 602 about the specific area as the entry destination can be presented to the user in a timely manner at the timing when the robot 101 enters the specific area.

Referring back to FIG. 8, the determination unit 807 specifies the service 702 that the moving object takes, based on the action 701 of the moving object. Specifically, for example, in the case of "stop", the robot 101 waits for a guidance request or an information provision request from the shopper. Therefore, the determination unit 807 determines the service 702 that the robot 101 takes as "present information". When the robot 101 receives the guidance request, the action 701 of the robot 101 becomes "guide". Therefore, the determination unit 807 refers to the setting information table 700, and determines the service 702 that the robot 101 takes as "advertise". When a predetermined time elapses since the robot 101 detects the leaving of the user, the action 701 of the robot 101 becomes "return" to return to the home position. Therefore, the determination unit 807 refers to the setting information table 700, and determines the service 702 that the robot 101 takes as "propagate".

The setting unit 808 sets a parameter related to information output from the moving object based on a determination result of the determination unit 807. Specifically, for example, the setting unit 808 refers to the setting information table 700, and sets the output parameter 703 corresponding to the service 702 determined by the determination unit 807. Accordingly, the information processing apparatus 800 can perform output according to the action 701 of the robot 101, and convenience of the user can be improved.

[Area Adjustment]

Next, area adjustment will be described. The adjustment unit 809 adjusts sizes of two adjacent specific areas between the two adjacent specific areas based on the priority 605 of the two adjacent specific areas in the movement route R. Specifically, two adjacent specific areas in the movement route R exist, for example, in three ways {ARa, ARb}, {ARb, ARc}, and {ARc, ARd} in FIG. 2. For example, in the case of {ARa, ARb}, the adjustment unit 809 extracts, from the advertisement information DB 600, a value "2" of the priority 605 of the value ADa1 of the specific advertisement information 602 about the specific area ARa and a value "6" of the priority 605 of the value ADb3 of the specific advertisement information 602 about the specific area ARb. The adjustment unit 809 adjusts sizes of the two adjacent specific areas such that the extracted area having a higher priority 605 has a larger area between the two adjacent specific areas. Here, an area adjustment example will be described with reference to FIGS. 9 to 11.

Figure 9:
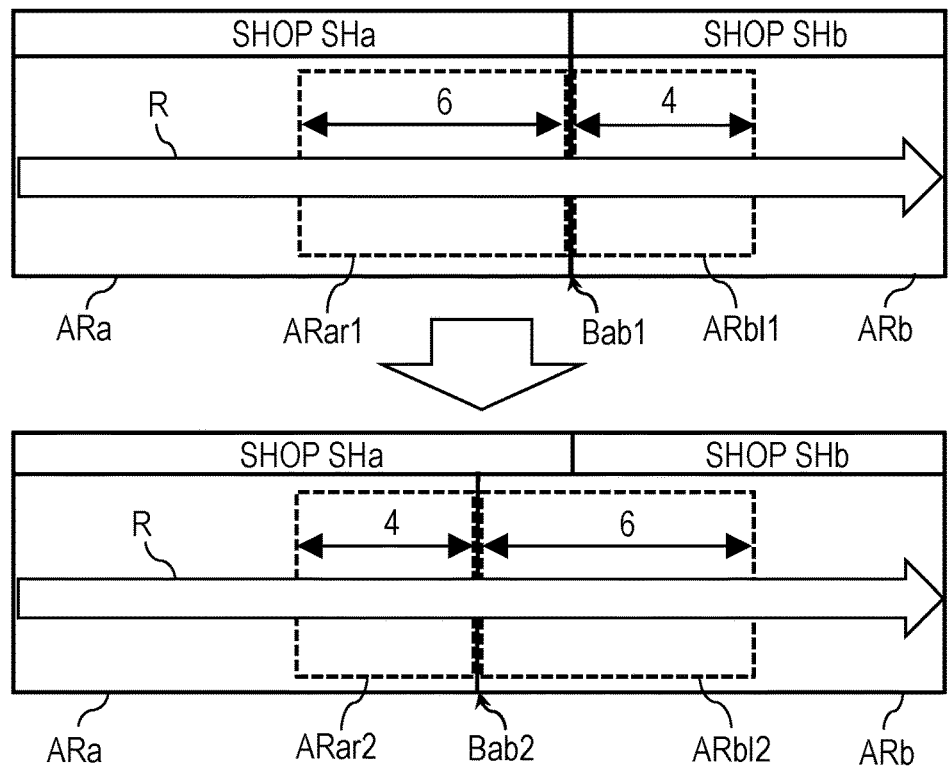
FIG. 9 is a diagram showing an area adjustment example 1 between two adjacent specific areas {ARa, ARb}.

FIG. 9 is a diagram showing an area adjustment example 1 between two adjacent specific areas {ARa, ARb}. In the specific area ARa, an area to be adjusted with respect to the specific area ARb is a partial area ARar1 on a boundary Bab1 side in the specific area ARa. On the other hand, in the specific area ARb, an area to be adjusted with respect to the specific area ARa is a partial area ARbl1 on the boundary Bab1 side in the specific area ARb. Each of the partial area ARar1 and the partial area ARbl1 is a half area of each of the two adjacent specific areas {ARa, ARb}. As an example, a length of the partial area ARar1 in the traveling direction in the movement route R is "6", and a length of the partial area ARbl1 in the traveling direction in the movement route R is "4".

Here, areas after the adjustment of the partial area ARar1 and the partial area ARbl1 are defined as a partial area ARar2 and a partial area ARbl2, respectively. Similarly, a boundary after the adjustment of the boundary Bab1 is defined as a boundary Bab2.

As described above, the value of the priority 605 of the value ADa1 of the specific advertisement information 602 about the specific area ARa is "2", and the value of the priority 605 of the value ADb3 of the specific advertisement information 602 about the specific area ARb is "6". Therefore, a ratio of the lengths of the partial area ARar2 to the partial area ARbl2 after the adjustment is weighted by multiplying a ratio (6:4) of the length of the partial area ARar2 and the partial area ARbl2 before the adjustment by the values "2" and "6" of the priority 605, and 12:24 is obtained. Therefore, a length of the partial area ARar2 after the adjustment in the traveling direction in the movement route R is "4", and a length of the partial area ARbl2 after the adjustment in the traveling direction in the movement route R is "6".

Figure 10:
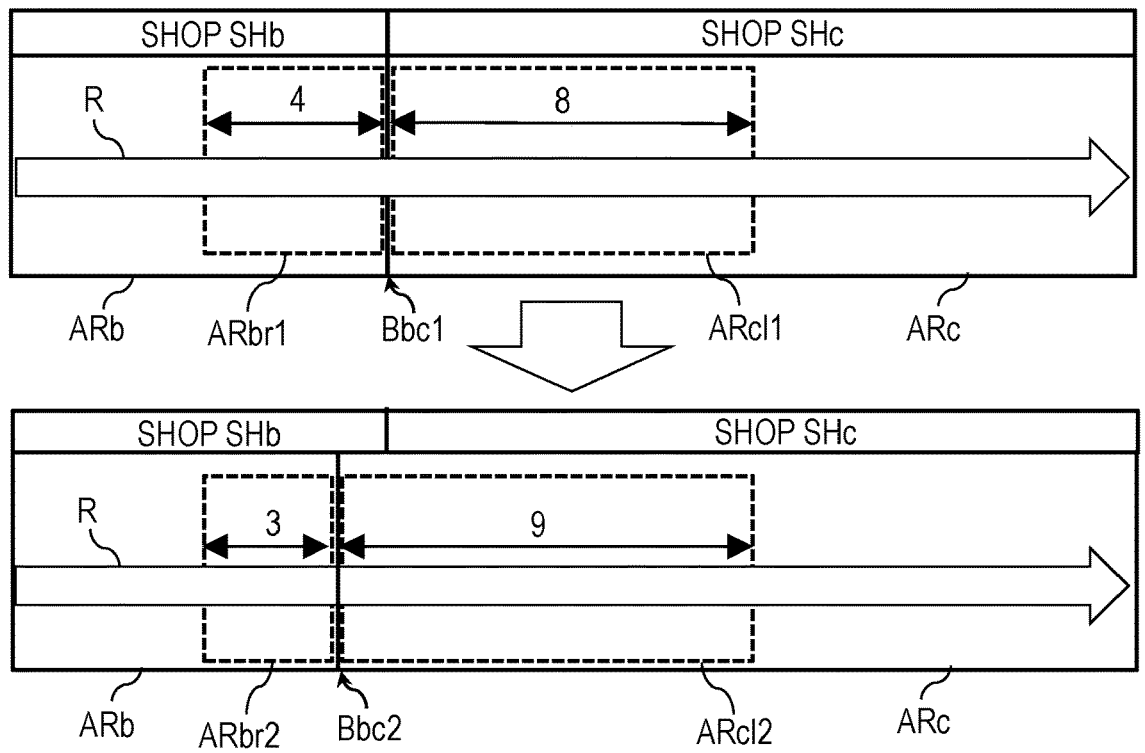
FIG. 10 is a diagram showing an area adjustment example 2 between two adjacent specific areas {ARb, ARc}.

FIG. 10 is a diagram showing an area adjustment example 2 between two adjacent specific areas {ARb, ARc}. In the specific area ARb, an area to be adjusted with respect to the specific area ARc is a partial area ARbr1 on a boundary Bbc1 side in the specific area ARb. On the other hand, in the specific area ARc, an area to be adjusted with respect to the specific area ARb is a partial area ARcl1 on the boundary Bbc1 side in the specific area ARc. Each of the partial area ARbr1 and the partial area ARcl1 is a half area of each of the two adjacent specific areas {ARb, ARc}. As an example, a length of the partial area ARbr1 in the traveling direction in the movement route R is "4", and a length of the partial area ARcl1 in the traveling direction in the movement route R is "8".

Here, areas after the adjustment of the partial area ARbr1 and the partial area ARcl1 are defined as a partial area ARbr2 and a partial area ARcl2, respectively. Similarly, a boundary after the adjustment of the boundary Bbc1 is defined as a boundary Bbc2.

As described above, the value of the priority 605 of the value ADb3 of the specific advertisement information 602 about the specific area ARb is "6", and the value of the priority 605 of the value ADc of the specific advertisement information 602 about the specific area ARc is "9". Therefore, a ratio of the lengths of the partial area ARbr2 to the partial area ARcl2 after the adjustment is 24:72 obtained by multiplying a ratio (4:8) of the length of the partial area ARbr2 to the partial area ARcl2 before the adjustment by the values "6" and "15" of the priority 605. Therefore, a length of the partial area ARbr2 after the adjustment in the traveling direction in the movement route R is "3", and a length of the partial area ARcl2 after the adjustment in the traveling direction in the movement route R is "9".

Figure 11:
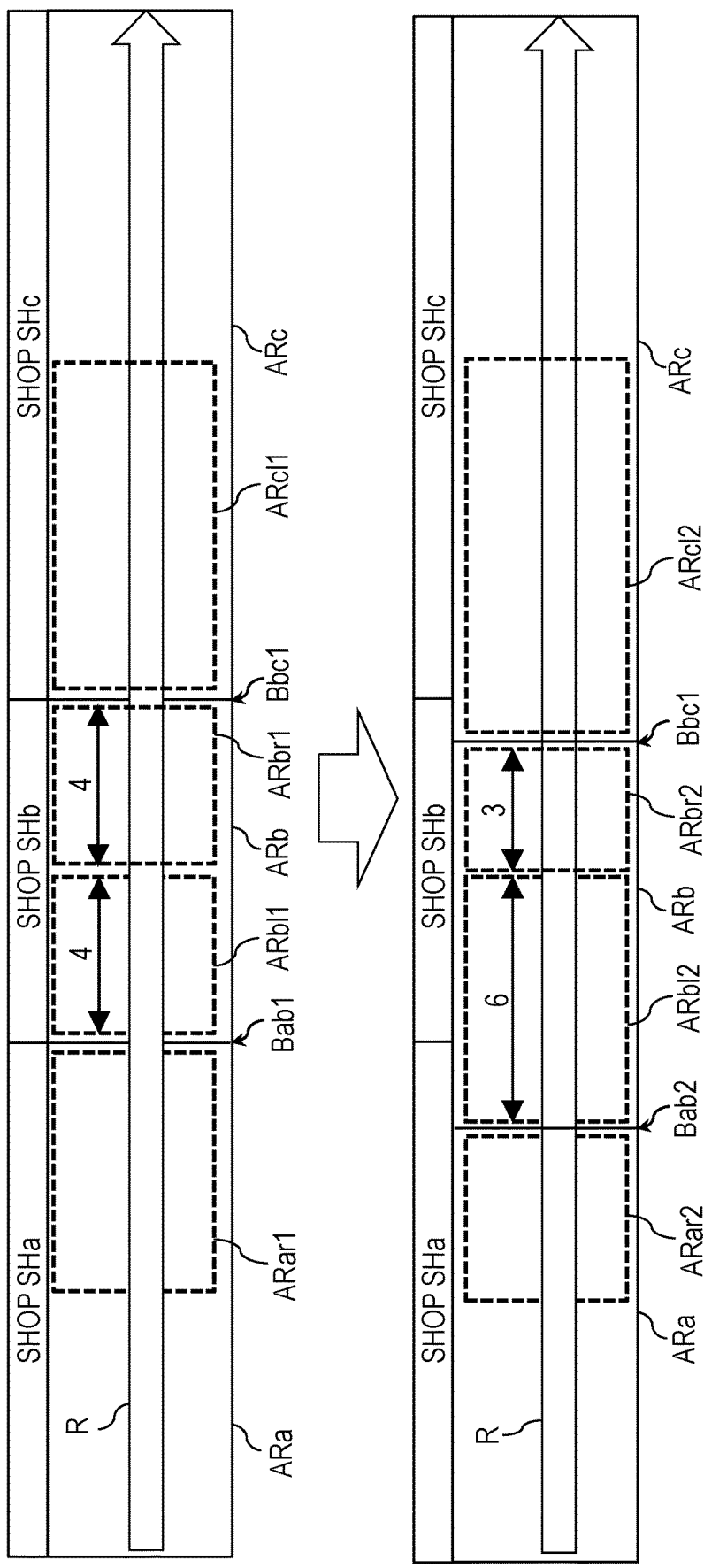
FIG. 11 is a diagram in which the area adjustment example 1 and the area adjustment example 2 are integrated.

FIG. 11 is a diagram in which the area adjustment example 1 and the area adjustment example 2 are integrated. Focusing on the length of the specific area ARb before and after the adjustment in the traveling direction in the movement route R, which is "8" (=4+4) before the adjustment, and is "9" (=6+3) after the adjustment. Accordingly, the output unit 805 outputs the specific advertisement information 602 about the specific area including the current position of the moving object during the movement of the moving object in the movement route R based on an adjustment result of the adjustment unit 809. That is, when the current position of the robot 101 is positioned in the specific area ARb (ARbl2 and ARbr2) after the adjustment, the output unit 805 outputs the value ADb3 of the specific advertisement information 602 about the specific area ARb. Accordingly, the size of the specific area can be dynamically changed according to the priority 605, and a degree of influence of the advertiser 601 can be reflected.

In the area adjustment example described above, although an example in which the area adjustment is performed based on the priority 605 is described, the area adjustment may be performed based on the characteristics of the specific person. For example, if the specific person is a child, and the advertisement information 602 about the area ARa is advertisement information of women's clothing (for example, the area ARa is in front of the women's clothing), and the advertisement information 602 about the area ARb is advertisement information of a toy store (for example, the area ARb is in front of the toy store), as shown in FIG. 9, the adjustment unit 809 may perform the area adjustment such that the area ARb is larger than the area ARa.

In this case, the advertisement information DB 600 associates attribute information (for example, adult male, adult female, or child) with the advertisement information 602, and the adjustment unit 809 may weight, for example, as "3" if the characteristic of the specific person matches the attribute, or as "1" if the characteristic of the specific person does not match the attribute, instead of the priority 605. Accordingly, the size of the area can be dynamically changed according to the characteristics of the user.

[Detour Route Generation]

Next, a processing for generating a detour route will be described. When an obstacle occurring after the generation of the movement route R exists in the movement route R, the robot 101 detects an obstacle that exists in the traveling direction by the detection unit 801, and generates a detour route by the generation unit 803. The detour route is a route that detours around the obstacle detected by the detection unit 801 from the movement route R and returns to the movement route R. When the detour route crosses an adjacent area of the specific area instead of the specific area in the movement route R, the extraction unit 804 extracts, from the advertisement information DB 600, the advertisement information 602 about the adjacent area corresponding to the characteristic of the user.

When a plurality of detour routes are generated, the selection unit 810 selects a specific detour route based on the priority 605 for the area in the detour route.

Figure 12:
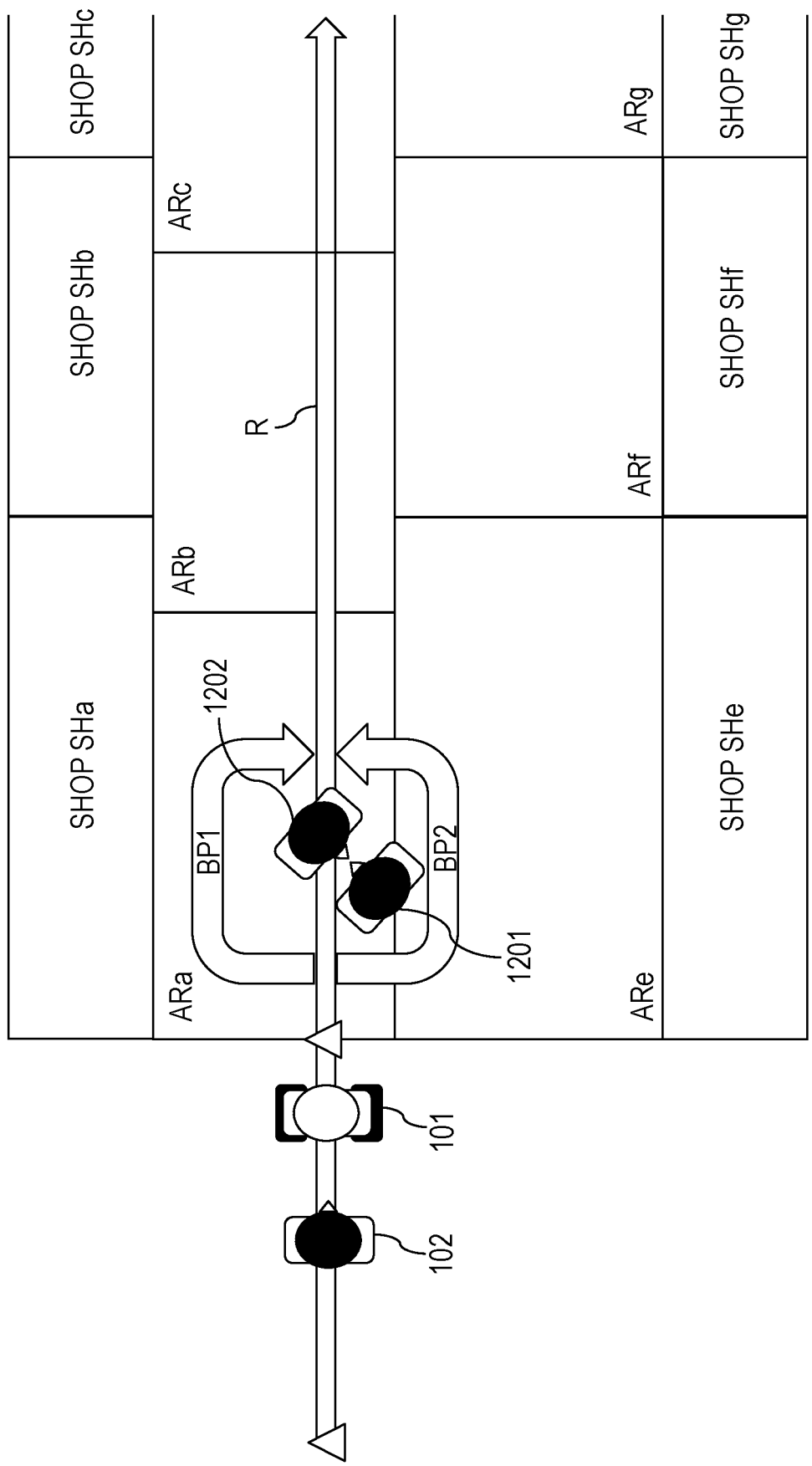
FIG. 12 is a diagram showing a detour route.

FIG. 12 is a diagram showing a detour route. In FIG. 12, the shoppers 1201 and 1202 are examples of the obstacle. The detection unit 801 detects the shoppers 1201 and 1202 as the obstacle, and the generation unit 803 generates detour routes BP1 and BP2 that detour around the shoppers 1201 and 1202. The selection unit 810 compares the priority 605 of the value ADa1 of the advertisement information 602 about the area ARa in the detour route BP2 and the priority 605 of the advertisement information 602 about the area ARe in the detour route BP1 corresponding to the characteristic of the user, and selects a detour route having a higher priority 605. Accordingly, the robot 101 can advertise in the detour route in consideration of the priority 605 while avoiding the obstacle (shoppers 1201 and 1202) by moving in the selected detour route.

When the robot 101 detours around along the detour route passing through the adjacent area, the setting unit 808 may set the output of the advertisement information 602 about the adjacent area based on a movement distance in the adjacent area and an advertisement time length of the advertisement information 602 about the adjacent area. Specifically, for example, when the user wants to pass through the detour route but the movement distance in the adjacent area is short, the sound output of the advertisement information 602 may not be performed to the end. In this case, the setting unit 808 adjusts a reproduction time length of the advertisement information 602 about the adjacent area to be equal to or less than a value obtained by dividing the movement distance in the adjacent area by the moving speed of the robot 101 by setting the moving speed in the output parameter 703 to a low speed or increasing the speech speed. Accordingly, the information processing apparatus 800 can output the advertisement information 602 to the end during the movement of the robot 101 in the detour route, and can prevent the reduction of an advertising effect.

[Follow Robot 101]

When the user leaves the robot 101 during the guidance or the guidance is completed, the robot 101 once stops, and the service 702 transits to "present information". Then, after a predetermined time elapses, the robot 101 generates a movement route R to the home position (hereinafter referred to as a return route), and the service 702 transits to "propagate". Then, the robot 101 returns to the home position along the return route. During the movement of the robot 101 along the return route, the shopper may follow the robot 101 without requesting guidance. Such a shopper is referred to as a follower. In this case, instead of simply "propagate" as the service 702, the robot 101 performs control so as to "advertise" to the follower. The operation in this case will be described with reference to FIG. 8.

The control unit 811 controls the movement of the robot 101 as a moving object. Specifically, for example, when no specific person is detected by the detection unit 801, the control unit 811 performs control so as to stop the moving object. A case were no specific person is detected by the detection unit 801 refers to a case where the user leaves the robot 101 for some reason during the guidance for the user, or the user arrives at the destination point and leaves the robot 101 after entering the shop. Specifically, for example, when no user is detected by the detection unit 801, the control unit 811 outputs a stop instruction of the robot 101 to the drive circuit 503, and the drive circuit 503 stops the drive mechanism of the robot 101.

When the moving object is stopped by the control unit 811, the determination unit 807 refers to the setting information table 700, and determines the service 702 that the robot 101 takes as "present information". After a predetermined time elapses, the determination unit 807 refers to the setting information table 700, and determines the service 702 that the robot 101 takes as "propagate". Then, when the determination unit 807 determines that the service 702 is "propagate", the generation unit 803 generates a return route from the current position to the home position. In this case, the control unit 811 outputs a drive instruction to the drive circuit 503 to move along the return route, and the drive circuit 503 drives the drive mechanism of the robot 101. Since the determination unit 807 determines that the service 702 is "propagate", the setting unit 808 sets the output parameter 703 to (VOL1,Vx1,Vy1).

The detection unit 801 detects the follower of the moving object when the specific person is no longer detected during the movement of the moving object to a specific point. The specific person mentioned here is a user guided by the robot 101. The specific point of the moving object is, for example, the home position of the robot 101. That is, the detection unit 801 detects the follower when the user is no longer detected during the movement to the home position along the return route. For example, during the movement of the robot 101 to the home position, a person who is continuously detected within a predetermined distance is the follower.

When the follower is detected by the detection unit 801, the acquisition unit 802 acquires the characteristic of the follower as a case of acquiring the characteristic of the specific person. The extraction unit 804 extracts, from the advertisement information DB 600, the specific advertisement information 602 about the specific area in the movement route R to a specific point based on the characteristic of the follower acquired by the acquisition unit 802. That is, similar as the case of guidance, the extraction unit 804 extracts, from the advertisement information DB 600, the advertisement information 602 about the area in the return route corresponding to the characteristic of the follower.

When the follower is detected by the detection unit 801, the determination unit 807 determines the service 702 that the robot 101 takes as from "propagate" to "guide". Then, the setting unit 808 changes the output parameter 703 from (VOL1,Vx1,Vy1) to (VOL2,Vx2,Vy2). Then, the output unit 805 outputs the advertisement information 602 when the robot 101 enters the area where the advertisement information 602 is extracted during the movement to the home position. Accordingly, the advertisement information 602 adapted to the characteristic of the follower can be output in a timely manner as if the follower is guided. For example, when the follower does not know a method of the guidance request on the robot 101, or when a guidance request operation is troublesome, an effective advertising operation is presented.

<Operation Processing Procedure Example 1 of Robot 101>

Figure 13:
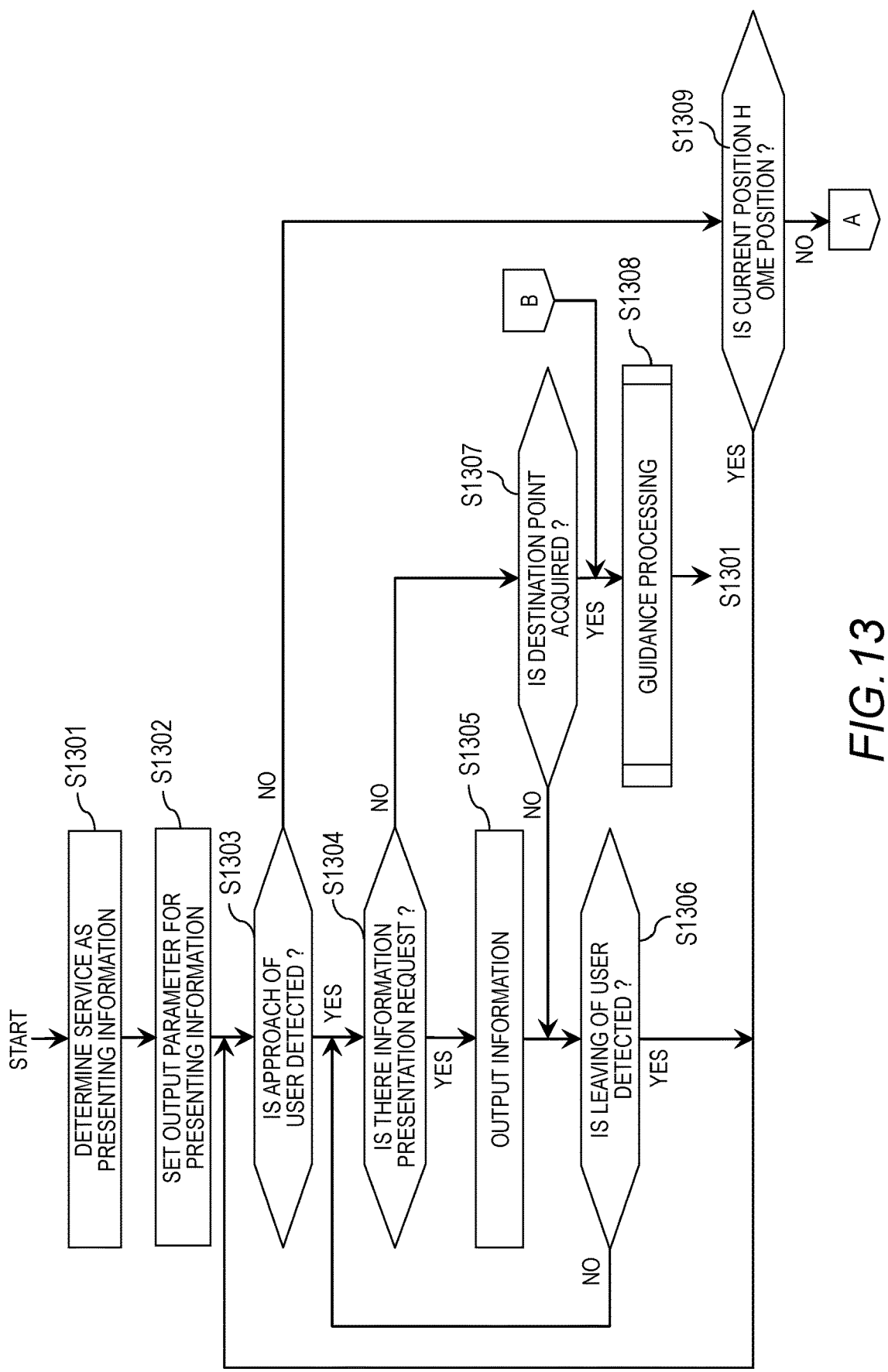
FIG. 13 is a flowchart 1 showing an operation processing procedure example of the robot.

FIG. 13 is a flowchart 1 showing an operation processing procedure example of the robot 101. At a time point of START, the robot 101 is during "stop". First, since a state of the robot 101 is during "stop", the robot 101 determines the service 702 as "present information" by the determination unit 807 (step S1301). Next, the robot 101 sets the output parameter 703 to the output parameter 703 (VOL3,Vx3,Vy3) for presenting information by the setting unit 808 (step S1302).

Then, the robot 101 judges whether approach of the user is detected by the detection unit 801 (step S1303). When the approach of the user is detected (step S1303: Yes), the robot 101 judges whether an information presentation request from the user is acquired by the acquisition unit 802 (step S1304). When the information presentation request is acquired (step S1304: Yes), the robot 101 outputs information corresponding to the information presentation request by the output unit 805 (step S1305). Thereafter, the robot 101 judges whether the leaving of the user is detected (step S1306). When the leaving is not detected (step S1306: No), the processing returns to step S1304. When the leaving is detected (step S1306: Yes), the processing returns to step S1303.

When the information presentation request is not acquired in step S1304 (step S1304: No), the robot 101 judges whether a destination point is acquired by the acquisition unit 802 (step S1307). When the destination point is not acquired (step S1307: No), the processing returns to step S1306. On the other hand, when the destination point is acquired (step S1307: Yes), the robot 101 executes a guidance processing (step S1308). The guidance processing (step S1308) is a processing in which the robot 101 guides the user to the destination point. After the execution of the guidance processing (step S1308), the processing returns to step S1301.

When the approach of the user is not detected in step S1303 (step S1303: No), the robot 101 judges whether the current position is the home position (step S1309). When the current position is the home position (step S1309: Yes), the processing returns to step S1303. On the other hand, when the current position is not the home position (step S1309: No), the processing shifts to step S1601 in FIG. 16.

<Guidance Processing (step S1308)>

Figure 14:
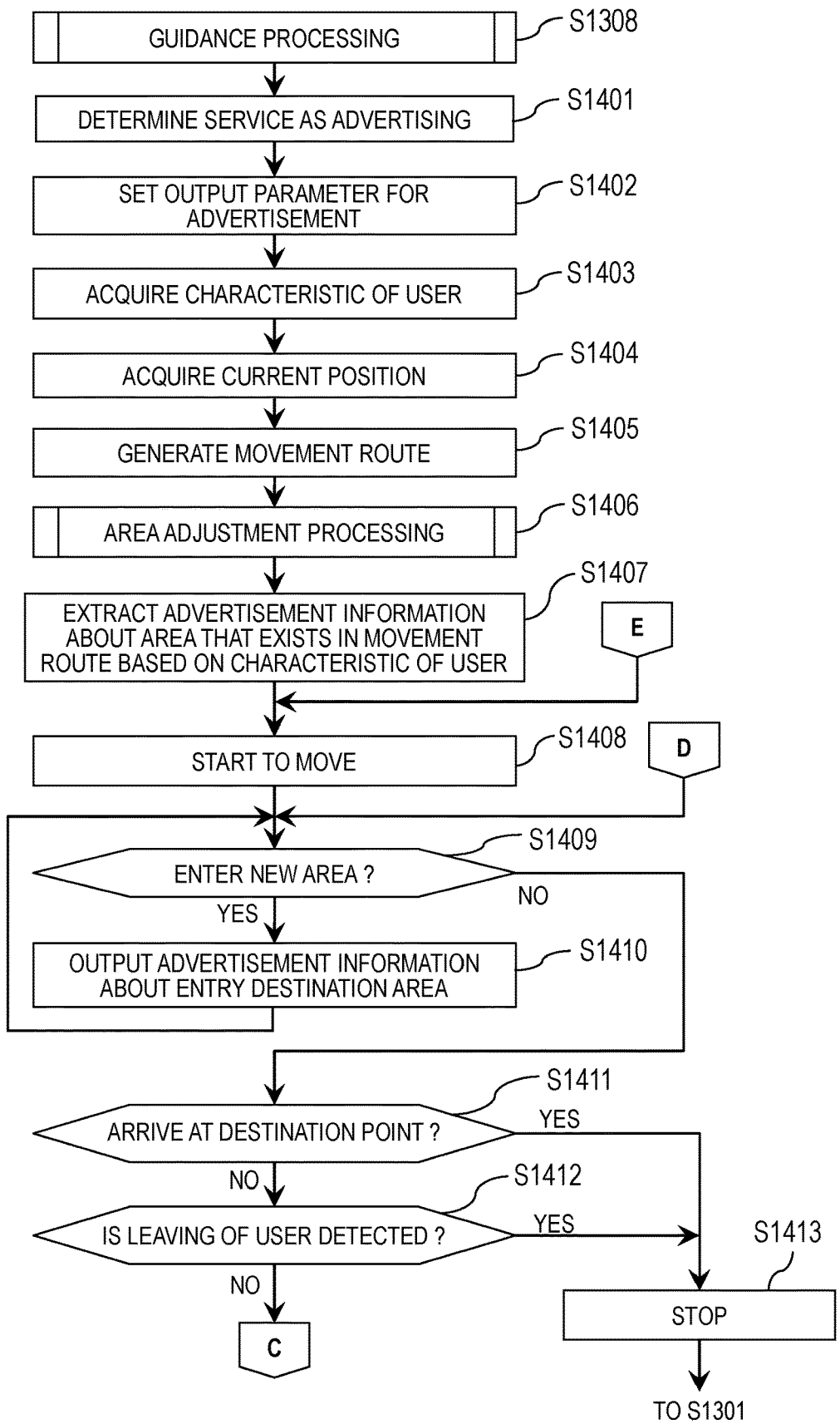
FIG. 14 is a flowchart showing a detailed processing procedure example 1 of a guidance processing (step S1308) shown in FIG. 13.

FIG. 14 is a flowchart showing a detailed processing procedure example 1 of the guidance processing (step S1308) shown in FIG. 13. Upon acquiring the destination point (step S1307), the robot 101 determines the service 702 as "advertise" by the determination unit 807 (step S1401). Next, the robot 101 sets the output parameter 703 to the output parameter 703 (VOL2,Vx2,Vy2) for advertisement by the setting unit 808 (step S1402).

Next, the robot 101 acquires the characteristic of the user by the acquisition unit 802 (step S1403), and acquires the current position of the robot 101 by the self-position estimation of the SLAM technique (step S1404). The robot 101 generates the movement route R to the destination point by the generation unit 803 (step S1405), and executes an area adjustment processing as shown in FIGS. 9 to 11 by the adjustment unit 809 (step S1406). Details of the area adjustment processing (step S1406) will be described later with reference to FIG. 16.

Thereafter, the robot 101 extracts, from the advertisement information DB 600, the advertisement information 602 about the area that exists in the movement route R based on the characteristic of the user (step S1407). Then, the robot 101 starts to move to the destination point according to the movement route R by the control unit 811 (step S1408). Then, it is judged whether the robot 101 enters a new area on the movement route R (step S1409). When the robot 101 enters a new area (S1409: Yes), the robot 101 outputs the advertisement information 602 about an entry destination area by the output unit 805 (step S1410), and the processing returns to step S1409.

When the robot 101 does not enter a new area on the movement route R in step S1409 (step S1409: No), the robot 101 judges whether the user arrives at a destination point (step S1411). When the user does not arrive at the destination point (step S1411: No), the robot 101 judges whether the leaving of the user is detected by the detection unit 801 (step S1412). When the user arrives at the destination point (step S1411: Yes) or the leaving of the user is detected (S1412: Yes), the robot 101 stops the movement (step S1413), and the processing returns to S1301. On the other hand, when the leaving of the user is not detected (step S1412: No), the processing shifts to step S1601 in FIG. 16.

Figure 15:
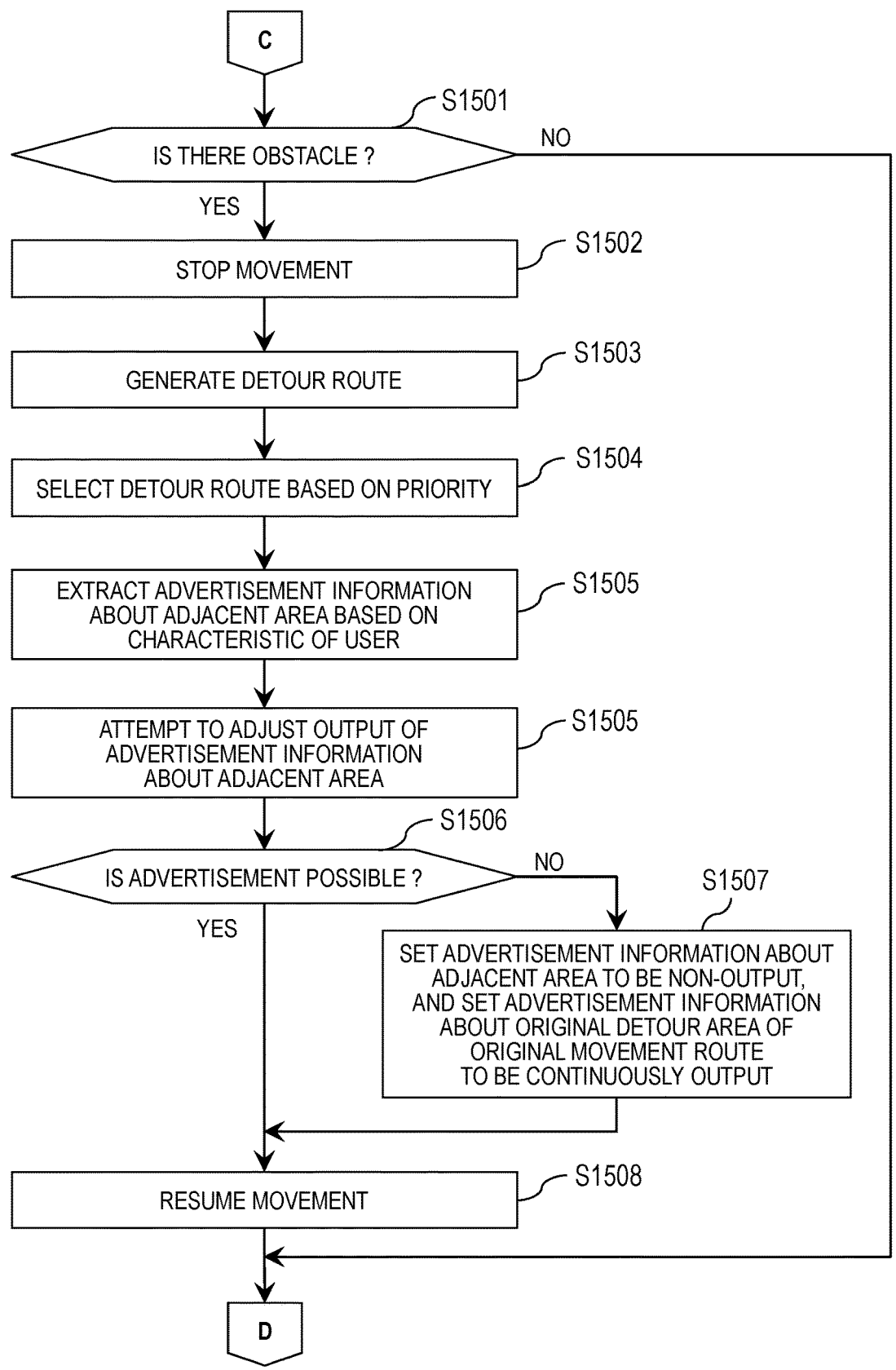
FIG. 15 is a flowchart showing a detailed processing procedure example 2 of the guidance processing (step S1308) shown in FIG. 13.

FIG. 15 is a flowchart showing a detailed processing procedure example 2 of the guidance processing (step S1308) shown in FIG. 13. The robot 101 judges whether an obstacle is detected by the detection unit 801 (step S1501). When the obstacle is not detected (step S1501: No), the processing returns to step S1409. On the other hand, when the obstacle is detected (step S1501: Yes), the robot 101 stops the movement (step S1502), and generates a detour route by the generation unit 803 (step S1502). Here, as shown in FIG. 12, when a plurality of detour routes are generated, the robot 101 selects a detour route based on the priority 605 for the area in the detour route by the selection unit 810 (step S1504).

Then, when an area in the selected detour route is an unextracted area of the advertisement information 602, that is, an adjacent area of the area in the original movement route R, the robot 101 extracts the advertisement information 602 about the adjacent area based on the characteristic of the user by the extraction unit 804 (step S1505). Next, when the detour route is a route that passes through the adjacent area, the robot 101 attempts to adjust the output of the advertisement information 602 about the adjacent area by the setting unit 808 (step S1505).

Specifically, for example, the robot 101 judges whether a reproduction time of the advertisement information 602 in the detour route is equal to or less than a value obtained by dividing a length of the detour route by the moving speed of the robot 101. If the reproduction time of the advertisement information 602 in the detour route is equal to or less than the value obtained by dividing the length of the detour route by the moving speed of the robot 101, the advertisement is possible. If the reproduction time of the advertisement information 602 about the adjacent area is more than the value obtained by dividing the length of the detour route by the moving speed of the robot 101, the robot 101 attempts to made adjustment by setting the moving speed in the output parameter 703 to a low speed or increasing the speech speed by the setting unit 808, such that the reproduction time length of the advertisement information 602 about the adjacent area is equal to or less than the value obtained by dividing the movement distance of the adjacent area by the moving speed of the robot 101.

When the adjustment can be made, the advertisement of the advertisement information 602 about the adjacent area is possible (step S1506: Yes), the processing shifts to step S1508. On the other hand, when the adjustment cannot be made (step S1506: No), the advertisement of the advertisement information 602 for the adjacent area is not possible. In this case, the robot 101 sets the advertisement information 602 about the adjacent area to be non-output, and sets the advertisement information 602 about the original detour area of the original movement route R to be continuously output (step S1507). Then, the processing shifts to step S1508. In step S1508, the robot 101 resumes the movement along the selected detour route, and the processing returns to step S1409.

When an area in the detour route selected in step S1503 is an area in the original movement route R, the robot 101 resumes the movement along the selected detour route without executing steps S1505 to S1507, and the processing returns to step S1409.

<Area Adjustment Processing (Step S1406)>

Figure 16:
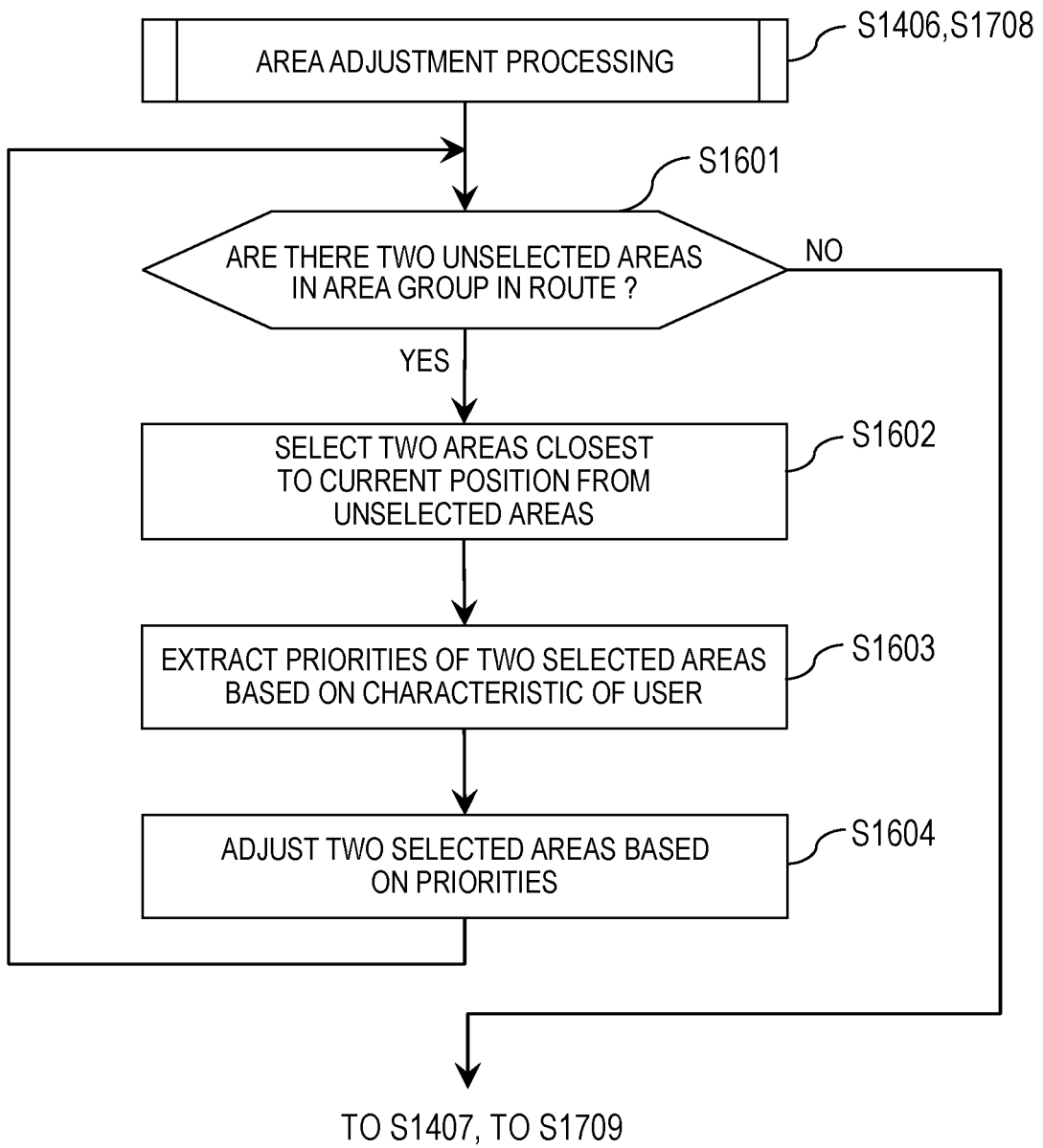
FIG. 16 is a flowchart showing a detailed processing procedure example of an area adjustment processing (step S1406).

FIG. 16 is a flowchart showing a detailed processing procedure example of the area adjustment processing (step S1406). The robot 101 judges whether there is a combination of two unselected adjacent areas in an area group in the route (step S1601). When there is a combination of two unselected adjacent areas (step S1601: Yes), the robot 101 selects a combination of two adjacent areas closest to the current position from unselected areas (step S1602). For example, in the case of the movement route R, the robot 101 selects the areas ARa and ARb as a combination of two unselected adjacent areas. When selecting again after the adjustment of the areas ARa and ARb, the robot 101 selects the areas ARb and ARc as a combination of two unselected adjacent areas.

Next, the robot 101 extracts, from the advertisement information DB 600, the priorities 605 of the two selected adjacent areas based on the characteristic of the user by the extraction unit 804 (step S1603). Then, the robot 101 adjusts sizes between the two adjacent areas based on the two priorities 605 by the adjustment unit 809 (step S1604), and the processing returns to step S1601. When there is no combination of two unselected adjacent areas in the area group in the route in step S1601 (step S1601: No), the processing shifts to step S1407. Accordingly, as shown in FIGS. 9 to 11, the sizes between the adjacent areas in the movement route R can be adjusted.

Figure 17:
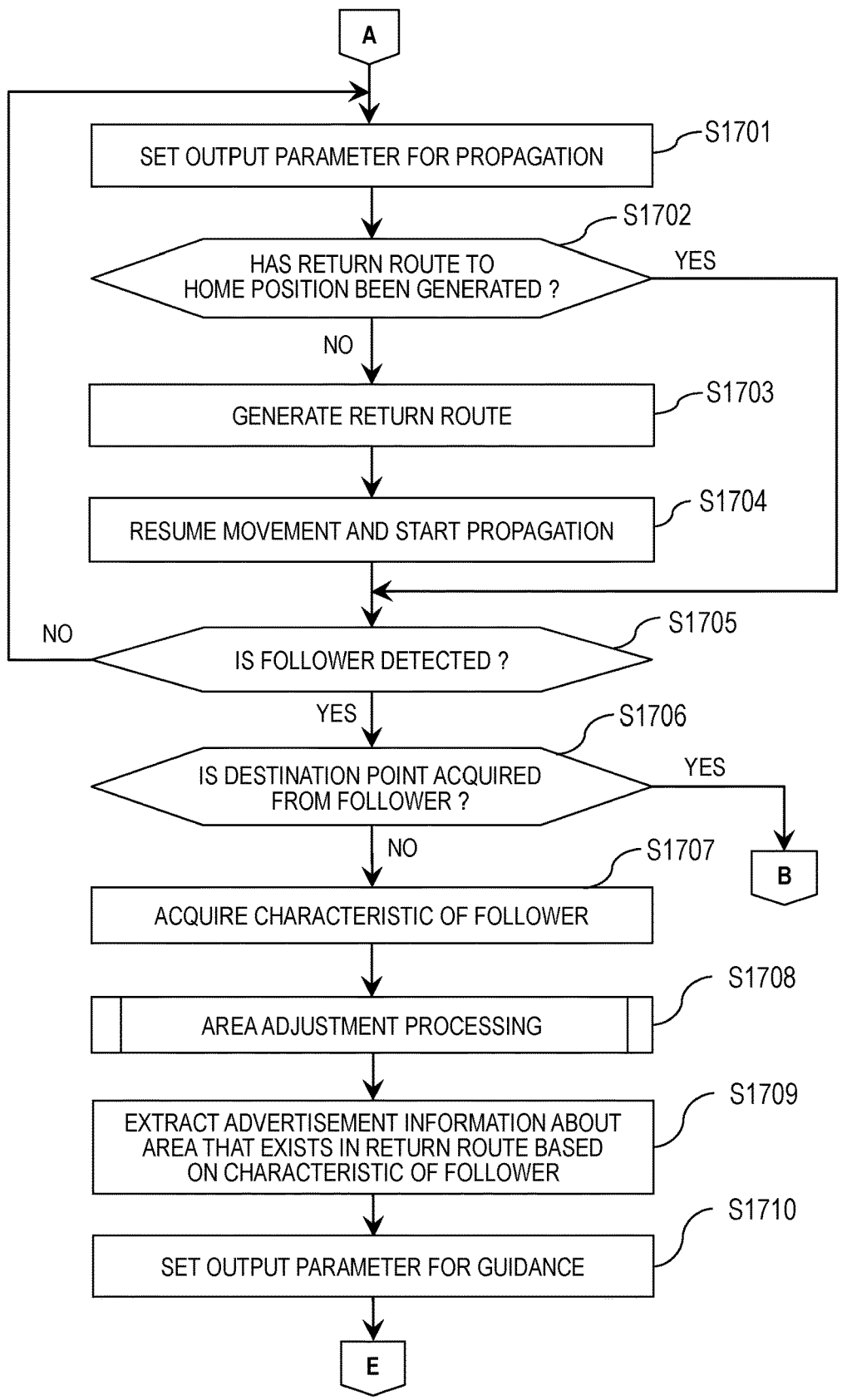
FIG. 17 is a flowchart 2 showing an operation processing procedure example of the robot.

FIG. 17 is a flowchart 2 showing an operation processing procedure example of the robot 101. After step S1309 in FIG. 13, after a predetermined time elapses from the stop state, the robot 101 sets the output parameter 703 to the output parameter 703 (VOL1,Vx1,Vy1) for propagation by the setting unit 808 (step S1701). The robot 101 judges whether a return route to the home position has been generated (step S1702). When the return route has been generated (step S1702: Yes), the processing shifts to step S1705. On the other hand, when the return route has not been generated (step S1702: No), the robot 101 generates a return route by the generation unit 803 (step S1703). Then, the robot 101 resumes the movement and starts the propagation (step S1704), and the processing shifts to step S1705.

Next, the robot 101 judges whether the follower is detected by the detection unit 801 (step S1705). When the follower is not detected (step S1705: No), the processing returns to step S1701. On the other hand, when the follower is detected (step S1705: Yes), the robot 101 judges whether a destination point can be acquired from the follower within a predetermined time by the acquisition unit 802 (step S1706).

When the destination point can be acquired from the follower (step S1706: Yes), the processing shifts to the guidance processing (step S1308). On the other hand, when the destination point cannot be acquired (step S1706: No), the robot 101 acquires the characteristic of the follower by the acquisition unit 802 (step S1707), and executes the area adjustment processing (step S1406) shown in step S1406 (step S1708). After executing the area adjustment processing (step S1708), the robot 101 extracts, from the advertisement information DB 600, the advertisement information 602 about the area that exists in the return route according to the characteristic of the follower (step S1709). Then, the robot 101 sets the output parameter 703 to the output parameter 703 (VOL2,Vx2,Vy2) for guidance by the setting unit 808 (step S1710), and the processing shifts to step S1408.

Thus, according to the robot 101 of the present embodiment, since the advertisement information 602 of the advertiser 601 who pays advertising fee for the area in the movement route R corresponding to the characteristic of the user is output when the robot 101 actually passes through the area, it is possible to immediately output an advertisement that is easy to match the preference of the user at a position of the user during the guidance. For example, if the position of the user during the guidance is the area in front of the shop of the advertiser 601 who pays the advertising fee to the area including the position, the advertisement information 602 of the shop can be output to the user in front of the shop during the guidance, and a timely advertisement can be presented.

In the present embodiment, although the map generation and the self-position estimation are performed using the SLAM technique, the current position on the map may be specified using the existing map information and GPS. In this case, the server 301 holds the map information, and the robot 101 includes a GPS receiver to acquire current position information. The robot 101 specifies a current position on the map, generates a route on the map, or performs guidance according to the generated route.

In the present embodiment, although an example in which the information processing apparatus 800 is mounted on the robot 101 in the information processing system provided with the server 301 and the robot 101 is described as an example, a mounting example is not limited thereto. For example, the robot 101 can be separately implemented by mounting the information processing apparatus 800 and the advertisement information DB 600 on the robot 101. The robot 101 may acquire information such as a destination point or a characteristic of the user, and output information such as the advertisement information 602 or the propagation information, and may execute other processing of the information processing apparatus 800 by the server 301. In this case, for example, the robot 101 transmits data about a specific person or a characteristic of the specific person to the server 301, the server 301 transmits the advertisement information to the robot 101, and the robot 101 outputs the advertisement information received from the server 301.

In the present embodiment, although an example in which the information processing apparatus 800 is mounted on the robot 101 is described, the information processing apparatus 800 may be a portable communication terminal such as a smartphone. In this case, since the characteristic of the user is a characteristic of an owner of the portable communication terminal, the detection unit 801 is unnecessary. Since the robot 101 is not provided, the control unit 811, the determination unit 807, or the setting unit 808 are unnecessary.

As described above, the information processing apparatus 800 of the present embodiment can implement effective advertisement output. For example, if the moving object is the robot 101 and the information processing apparatus 800 is a computer mounted on the robot 101, it is possible to output an effective advertisement for a passed area during the guidance to a destination point. For example, even when the moving object is the robot 101 and the information processing apparatus 800 is the server 301 that remotely controls the robot 101, it is possible to output an effective advertisement for a passed area during the guidance to the destination point. Even when the moving object is the user himself/herself and the information processing apparatus 800 is a portable communication terminal of the user, it is possible to output an effective advertisement for a passed area during the guidance to the destination point.

The information processing apparatus 800 of the present embodiment can implement effective advertisement content and advertisement timing by outputting advertisement information about the current position of the moving object during the movement.

The information processing apparatus 800 of the present embodiment can implement effective advertisement content and advertisement timing for a specific person during the guidance to a destination point.

The information processing apparatus 800 of the present embodiment can switch the advertisement information to the advertisement information about the entry destination area each time the moving object enters the area, and can implement effective advertisement content and advertisement timing for each area.

The information processing apparatus 800 of the present embodiment can improve the advertising effect of the shop in the vicinity of the area where the moving object is positioned, by outputting the advertisement information related to the area.

The information processing apparatus 800 of the present embodiment can dynamically change the size of the area by executing the area adjustment, and can substantially extend or shorten an output period of the advertisement for each area.

The information processing apparatus 800 of the present embodiment can dynamically change the size of the area according to the priority of the advertiser by executing the area adjustment according to the priority of the advertiser. Accordingly, the area of the advertiser having a higher priority can be enlarged, and the output period of the advertisement can be made substantially longer.

The information processing apparatus 800 of the present embodiment can implement information output according to the action of the moving object.

The information processing apparatus 800 of the present embodiment can implement advertisement output suitable for the guidance service according to the action of the moving object.

The information processing apparatus 800 of the present embodiment can flexibly deal with the output of the advertisement information by outputting the advertisement information in the detour route when the detour route that detours around the obstacle is out of the movement route.

The information processing apparatus 800 of the present embodiment can easily select an area having a higher priority for the detour route by giving a priority to an area of an advertiser having a high priority when a plurality of detour routes exist.

The information processing apparatus 800 of the present embodiment can adjust the output of advertisement information in a detour route. For example, an output time length of the advertisement information, the moving speed of the moving object, and the speech speed of the sound output can be adjusted according to the movement distance of the area passing through the detour route, and the output of the advertisement information can be completed within a passage period in the area.

The information processing apparatus 800 of the present embodiment can output an advertisement suitable for the follower to the follower of the moving object.

It should be noted that the invention is not limited to the above embodiments and includes various modifications and equivalent configurations within the spirit of the claims. For example, the above embodiments have been described in detail in order to make the invention easy to understand, and the invention is not necessarily limited to those which have all the configurations described. In addition, a part of a configuration of a certain embodiment may be replaced with a configuration of another embodiment. In addition, a configuration of another embodiment may be added to a configuration of a certain embodiment. Further, another configuration may be added to, subtracted from or replaced with a part of a configuration of each embodiment.

In addition, parts or all of the configurations, functions, processing units, processing methods and the like may be implemented by hardware, for example by designing with an integrated circuit, or may be implemented by hardware, with a processor to interpret and execute a program that implements each function.

Information such as a program, a table, and a file that implements each function can be stored in a storage device such as a memory, a hard disk, and a solid state drive (SSD), or a recording medium such as an integrated circuit (IC) card, an SD card, and a digital versatile disc (DVD).

In addition, control lines and information lines that are considered to be necessary for the description are shown, and not all the control lines and information lines that are necessary for mounting are shown. It may be considered that almost all the configurations are actually connected to each other.

The invention claimed is:

1. An information processing apparatus which is configured to access a database in which a characteristic of a person and advertisement information are respectively associated with each other for each one in an area group within a movement range of a moving object, and configured to control a movement of the moving object, the information processing apparatus comprising:
   a processor coupled to a memory storing instructions that when executed configure the processor to:
   detect a specific person that exists within a predetermined distance from the moving object
   acquire a characteristic of the specific person detected,
   determine a movement route to a destination point of the moving object based on the characteristic of the specific person, the movement route including a route through at least a first area and a second area having a common boundary with the first area,
   determine a first partial area of the first area, which has a first length along the movement route direction, that is half the length of the first area, and determine a second partial area of the second area, which has a second length along the movement route direction, that is half the length of the second area,
   obtain a first priority of a first advertisement for the first area and obtain a second priority of a second advertisement for the second area,
   determine respective ratios of the first length and the second length based on the multiplying the first length and the second length by the first priority and the second priority, respectively,
   determine a first adjusted area having a first adjusted length and a second adjusted area having a second adjusted length based on the respective ratios,
   extract, from the database, specific advertisement information about the first area and the second area based on the characteristic of the specific person, and
   output the extracted specific advertisement information based on the first adjusted area and the second adjusted area.

2. The information processing apparatus according to claim 1, wherein
   the processor is configured to output the specific advertisement information about the specific area including a current position of the moving object during a movement of the moving object in the movement route.

3. The information processing apparatus according to claim 2, wherein
the processor is configured to output the specific advertisement information about the specific area including the current position of the moving object during detection of the specific person.

4. The information processing apparatus according to claim 1,
wherein the processor is configured to judge whether the moving object enters the specific area based on the current position of the moving object, and
output, based on a judgement result, the specific advertisement information about the specific area that is an entry destination of the moving object.

5. The information processing apparatus according to claim 2, wherein
the characteristic of the person, the advertisement information, and a priority related to the advertisement information in the database, which includes the first priority and the second priority, are associated with one another for each one in the area group.

6. The information processing apparatus according to claim 5, wherein
the priority, which includes the first priority and the second priority, is a priority related to an advertiser of the advertisement information.

7. The information processing apparatus according to claim 1,
wherein the processor is configured to determine a service that the moving object takes based on an action of the moving object,
set, based on a determination result, a parameter related to information output from the moving object, and
output information based on the set parameter.

8. The information processing apparatus according to claim 7, wherein
wherein the processor is configured to determine the service as output of the advertisement information when the action of the moving object is guidance of the specific person to the destination point,
set the parameter related to the output of the advertisement information from the moving object, and
output the specific advertisement information based on the parameter related to the output of the advertisement information from the set moving object.

9. The information processing apparatus according to claim 1, wherein
wherein the processor is configured to detect an obstacle that exists in a traveling direction of the moving object, and
extract, from the database, when an area in a detour route that detours around the obstacle detected by the detection unit from the movement route and returns to the movement route is an adjacent area of the specific area, advertisement information about the adjacent area.

10. The information processing apparatus according to claim 9, wherein
the characteristic of the person, the advertisement information, and a priority related to the advertisement information in the database, which includes a first priority and a second priority, are associated with one another for each one in the area group,
wherein the processor is configured to select, when a plurality of detour routes exist, a specific detour route based on priorities for areas in each detour route is included, and extract, from the database, when an area in the specific detour route selected is the adjacent area, advertisement information about the adjacent area.

11. The information processing apparatus according to claim 9,
wherein the processor is configured to set output of the advertisement information about the adjacent area based on a movement distance of the moving object in the adjacent area and an advertisement time length of the advertisement information about the adjacent area, and
output the advertisement information about the specific area according to a predetermined content.

12. The information processing apparatus according to claim 1, wherein
wherein the processor is configured to detect a follower of the moving object when the specific person is no longer detected during a movement of the moving object to a specific point,
acquire a characteristic of the follower when the follower is detected, and
extract, from the database, specific advertisement information about a specific area in a movement route to the specific point based on the characteristic of the follower acquired by the acquisition unit.

13. An information processing method performed by an information processing apparatus which is configured to access a database in which a characteristic of a person and advertisement information are respectively associated with each other for each one in an area group within a movement range of a moving object, and configured to control a movement of the moving object, the information processing method comprising:
executing by the information processing apparatus,
a detection processing of detecting a specific person that exists within a predetermined distance from the moving object;
an acquisition processing of acquiring a characteristic of the specific person detected by the detection processing;
determining a movement route to a destination point of the moving object based on the characteristic of the specific person, the movement route including a route through at least a first area and a second area having a common boundary with the first area;
determining a first partial area of the first area, which has a first length along the movement route direction, that is half the length of the first area, and determine a second partial area of the second area, which has a second length along the movement route direction, that is half the length of the second area;
obtaining a first priority of a first advertisement for the first area and obtain a second priority of a second advertisement for the second area;
determining respective ratios of the first length and the second length based on the multiplying the first length and the second length by the first priority and the second priority, respectively;
determining a first adjusted area having a first adjusted length and a second adjusted area having a second adjusted length based on the respective ratios;
extracting, from the database, specific advertisement information about the first area and the second area based on the characteristic of the specific person; and an output processing of outputting the extracted specific
advertisement information based on the first adjusted
area and the second adjusted area.

* * * * *